US010993127B2

(12) United States Patent
Sun et al.

(10) Patent No.: US 10,993,127 B2
(45) Date of Patent: Apr. 27, 2021

(54) NETWORK SLICE INSTANCE MANAGEMENT METHOD, APPARATUS, AND SYSTEM

(71) Applicant: HUAWEI TECHNOLOGIES CO., LTD., Shenzhen (CN)

(72) Inventors: Wenqi Sun, Shenzhen (CN); Shuigen Yang, Shanghai (CN); Wei Lu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/574,211

(22) Filed: Sep. 18, 2019

(65) Prior Publication Data
US 2020/0015102 A1 Jan. 9, 2020

Related U.S. Application Data

(63) Continuation of application No. PCT/CN2018/078793, filed on Mar. 13, 2018.

(30) Foreign Application Priority Data

Mar. 20, 2017 (CN) .......................... 201710167282.8

(51) Int. Cl.
H04W 4/00 (2018.01)
H04W 24/02 (2009.01)
H04W 16/02 (2009.01)

(52) U.S. Cl.
CPC ........... H04W 24/02 (2013.01); H04W 16/02 (2013.01)

(58) Field of Classification Search
CPC ..... H04W 16/02; H04W 16/10; H04W 24/00; H04W 24/02; H04W 24/04; H04W 24/08; H04W 24/10; H04W 88/08
(Continued)

(56) References Cited

U.S. PATENT DOCUMENTS 6,493,549 B1 * 12/2002 Axelson ................ H04W 8/245
455/186.1
10,129,108 B2 * 11/2018 Vrzic ..................... H04W 24/08
(Continued)

FOREIGN PATENT DOCUMENTS

CN 106341832 A 1/2017
CN 106375987 A 2/2017

OTHER PUBLICATIONS

SA5, "Presentation of Specification/Report to TSG 28.801, Version 1.0.0", 3GPP TSG-SA Meeting #75, Tdoc SP-170123, Mar. 8-10, 2017, 1 page, Dubrovnik, Croatia.
(Continued)

Primary Examiner — Temica M Beamer
(74) Attorney, Agent, or Firm — Maier & Maier, PLLC

(57) ABSTRACT

A network slice instance management method, an apparatus, and a system. The method includes: determining, by a first network device, that a configuration parameter of a first network slice subnet instance needs to be modified, where the first network device is configured to manage the first network slice subnet instance; modifying, by the first network device, the configuration parameter of the first network slice subnet instance; and sending, by the first network device, report information to a second network device, where the report information is used to indicate a result of modifying the configuration parameter of the first network slice subnet instance, the second network device is configured to manage a first network slice instance, and the first network slice instance includes the first network slice subnet instance.

16 Claims, 17 Drawing Sheets

(58) Field of Classification Search
USPC .................................. 455/422.1, 424, 418
See application file for complete search history.

(56) References Cited

U.S. PATENT DOCUMENTS

| | | | |
|---|---|---|---|
| 2017/0054595 A1 | 2/2017 | Zhang et al. | |
| 2018/0139106 A1* | 5/2018 | Senarath | H04L 67/16 |
| 2019/0021047 A1 | 1/2019 | Zong | |
| 2020/0052969 A1* | 2/2020 | Xu | H04L 41/5019 |

OTHER PUBLICATIONS

Ericsson, "Use case and requirements for modify network slice subnet instance", 3GPP TSG SA WGS (Telecom Management) Meeting #111 Bis, SA-170171, Feb. 13-17, 2017, Munich, Germany. total 6 pages.

3GPP, "3rd Generation Partnership Project; Technical Specification Group Services and System Aspects; Telecommunication management; Study on management and orchestration of network slicing for next generation network (Release 14)", 3GPP TR 28.801 V1.0.0, Mar. 2017, total 52 pages.

Huawei, "Adding network slicing management related functions", 3GPP TSG SA WG5 (Telecom Management) Meeting #111 Bis, S5A-170282, Feb. 13-17, 2017, total 2 page, Munich, Germany.

Huawei, "Editorial change for use case reorganization", 3GPP TSG SA WG5 (Telecom Management) Meeting #113, SS-173143, May 8-12, 2017, total 10 pages, West Palm Beach, Florida, US.

Intel, "Add UC on Self-Configuration of NSI", 3GPP TSG SA WG5 (Telecom Management) Meeting #112, S5-171552, Mar. 27-31, 2017, total 2 pages, Guilin, P.R. China.

Huawei et al., "Add use case and requirements for NSSI self-optimization", 3GPP TSG SA WG5 (Telecom Management) Meeting #112, S5-171679, Mar. 27-31, 2017, total 2 pages, Guilin, China.

* cited by examiner

NETWORK SLICE INSTANCE MANAGEMENT METHOD, APPARATUS, AND SYSTEM

CROSS-REFERENCE TO RELATED APPLICATIONS

This application is a continuation of International Application No. PCT/CN2018/078793, filed on Mar. 13, 2018, which claims priority to Chinese Patent Application No. 201710167282.8, filed on Mar. 20, 2017. The disclosures of the aforementioned applications are hereby incorporated by reference in their entireties.

FIELD

This application relates to the communications field, and more specifically, to a network slice instance management method, an apparatus, and a system.

BACKGROUND

With rapid development of mobile communications, a future mobile communications system needs to meet diversified service requirements, for example, enhanced mobile broadband, massive machine-type communications, ultra-reliable and low-latency communications, and the like. Therefore, a concept of network slices is proposed in a next generation mobile communications system. In network slicing technologies, a network is logically abstracted into one or more network slices. Each network slice includes a series of logical network functions, and one network slice can meet a connection and communication service requirement of a type of case or a case. The next generation mobile communications system may include a large quantity of network slices that have different connection capabilities.

On a communications network, how to effectively manage a network is a problem to be urgently resolved, in order to meet a requirement for flexible management on a network slice level.

SUMMARY

Exemplary embodiments shown and described in this application provide a network slice instance management method, an apparatus, and a system to improve efficiency of network slice instance management.

According to a first aspect, a network slice instance management method is provided, including: determining, by a first network device, that a configuration parameter of a first network slice subnet instance needs to be modified, where the first network device is configured to manage the first network slice subnet instance; modifying, by the first network device, the configuration parameter of the first network slice subnet instance; and sending, by the first network device, report information to a second network device, where the report information is used to indicate a result of modifying the configuration parameter of the first network slice subnet instance, the second network device is configured to manage a first network slice instance, and the first network slice instance includes the first network slice subnet instance.

In an embodiment of this application, the first network device managing the first network slice subnet instance may independently determine that the configuration parameter of the first network slice subnet instance needs to be modified, and report the result of modifying the configuration parameter of the first network slice subnet instance to the second network device. In this way, network slice instances can be flexibly managed, thereby improving efficiency of network slice instance management.

In a possible implementation, the method further includes: receiving, by the first network device, a self-optimization policy from the second network device, where the self-optimization policy is used to indicate a rule of modifying a network slice subnet instance; and modifying, by the first network device, the configuration parameter of the first network slice subnet instance includes: modifying, by the first network device, the configuration parameter of the first network slice subnet instance based on the self-optimization policy.

In a possible implementation, the method further includes: receiving, by the first network device, authorization information from the second network device, where the authorization information is used to indicate permission for modifying the configuration parameter of the first network slice subnet instance.

In a possible implementation, the method further includes: the configuration parameter of the first network slice subnet instance includes a capacity size of the first network slice subnet instance and a capability parameter of the first network slice subnet instance.

According to a second aspect, a network slice instance management method is provided, including: receiving, by a second network device, report information from a first network device, where the report information is used to indicate a result of modifying a configuration parameter of a first network slice subnet instance, the first network device is configured to manage the first network slice subnet instance, the second network device is configured to manage a first network slice instance, and the first network slice instance includes the first network slice subnet instance.

In a possible implementation, the method further includes: sending, by the second network device, a self-optimization policy to the first network device, where the self-optimization policy is used to indicate a rule of modifying a network slice subnet instance.

In a possible implementation, the method further includes: sending, by the second network device, authorization information to the first network device, where the authorization information is used to indicate permission for modifying the configuration parameter of the first network slice subnet instance.

In a possible implementation, the method further includes: the configuration parameter of the first network slice subnet instance includes a capacity size of the first network slice subnet instance and a capability parameter of the first network slice subnet instance.

According to a third aspect, a network slice instance management method is provided, including: determining, by a first network device, to modify a configuration parameter of a first network slice instance, where the first network slice instance includes at least one network slice subnet instance; sending, by the first network device, first indication information to at least one second network device, where the first indication information is used to instruct the at least one second network device to modify a configuration parameter of the at least one network slice subnet instance; and receiving, by the first network device, first reply information from the at least one second network device, where the first reply information is used to indicate a result of modifying the configuration parameter of the at least one network slice subnet instance.

In an embodiment of this application, the first network device may independently determine to modify the first network slice instance, where the first network slice instance includes the at least one network slice subnet instance, and send the first indication information to a second network device managing a first network slice subnet instance, to modify the network slice subnet instance. This can flexibly modify a network slice instance, thereby improving efficiency of network slice instance management.

In a possible implementation, the method further includes: obtaining, by the first network device, current configuration information of the at least one network slice subnet instance from the at least one second network device; and the determining, by a first network device, to modify a configuration parameter of a first network slice instance includes: determining, by the first network device based on the current configuration information of the at least one network slice subnet instance, to modify the configuration parameter of the first network slice instance.

In a possible implementation, before the sending, by the first network device, of first indication information to at least one second network device, the method further includes: obtaining, by the first network device, authorization information from a third network device, where the authorization information is used to indicate permission for modifying the configuration parameter of the first network slice instance.

In a possible implementation, the method further includes: receiving, by the first network device, a self-optimization policy from the third network device, where the self-optimization policy is used to indicate a rule of modifying a network slice instance; and the determining, by a first network device, to modify a configuration parameter of a first network slice instance includes: modifying, by the first network device, the configuration parameter of the first network slice instance based on the self-optimization policy.

In a possible implementation, the method further includes: sending, by the first network device, report information to the third network device, where the report information is used to indicate a result of modifying the configuration parameter of the first network slice instance.

In a possible implementation, the method further includes: the configuration parameter of the first network slice instance includes at least one of the following: a capacity size of the first network slice instance or a capability parameter of the first network slice instance.

According to a fourth aspect, a network slice instance management method is provided, including: receiving, by a second network device, first indication information sent by a first network device, where the first indication information is used to instruct the second network device to modify a first network slice subnet instance, the first network device is configured to manage a first network slice instance, and the first network slice instance includes the first network slice subnet instance; and sending, by the second network device, first reply information to the first network device, where the first reply information is used to indicate a result of modifying a configuration parameter of a first network slice subnet instance.

In a possible implementation, the method further includes: sending, by the second network device, current configuration information of the first network slice subnet instance to the first network device.

In a possible implementation, a configuration parameter of the first network slice instance includes at least one of the following: a capacity size of the first network slice instance or a capability parameter of the first network slice instance.

According to a fifth aspect, a network slice instance management method is provided, including: determining, by a first network device, that a first network function of a first network slice instance needs to be optimized; optimizing, by the first network device, the first network function, where the optimization includes: modifying a configuration parameter of the first network function, or replicating the first network function and adding the second network function to the first network slice instance, so that the first network slice instance includes the second network function; and sending, by the first network device, report information to a second network device, where the report information is used to indicate a result of optimizing the first network function by the first network device, and the second network device is configured to manage the first network slice instance.

In an embodiment of this application, the first network device may manage the first network function. The second network device manages the first network function by using the first network device. The first network slice instance includes the first network function. In this way, network slice instances can be flexibly managed, thereby improving efficiency of network slice instance management.

In a possible implementation, the method further includes: receiving, by the first network device, a self-optimization policy from the second network device, where the self-optimization policy is used to indicate a rule of modifying a network function; and the optimizing, by the first network device, the first network function includes: optimizing, by the first network device, the first network function based on the self-optimization policy.

In a possible implementation, the first network device obtains authorization information from the second network device, where the authorization information is used to indicate permission for optimizing the first network function.

In a possible implementation, the configuration parameter of the first network function includes a location parameter, a topology parameter, and a function parameter of the first network function.

In a possible implementation, the method further includes: sending, by the first network device, reservation request information to a third network device, where the reservation request information is used to instruct the third network device to reserve a network resource for the first network function, and the third network device is configured to allocate a network resource to a network function.

According to a sixth aspect, a network slice instance management method is provided, including: receiving, by a second network device, report information from a first network device, where the report information is used to indicate a result of modifying a configuration parameter of a first network function, the first network device is configured to manage the first network function, the second network device is configured to manage a first network slice instance, and the first network slice instance includes the first network function.

In a possible implementation, the method further includes: sending, by the second network device, a self-optimization policy to the first network device, where the self-optimization policy is used to indicate a rule of modifying a network function.

In a possible implementation, the method further includes: sending, by the second network device, authorization information to the first network device, where the authorization information is used to indicate permission for modifying the configuration parameter of the first network function.

In a possible implementation, the configuration parameter of the first network function includes a location parameter, a topology parameter, and a function parameter of the first network function.

According to a seventh aspect, a network slice instance management network device is provided, to perform the method according to any one of the first aspect, or the possible implementations of the first aspect. For example, the network device includes a unit configured to perform the method according to any one of the first aspect, or the possible implementations of the first aspect.

According to an eighth aspect, another network slice instance management network device is provided, to perform the method according to any one of the second aspect, or the possible implementations of the second aspect. For example, the network device includes a unit configured to perform the method according to any one of the second aspect, or the possible implementations of the second aspect.

According to a ninth aspect, another network slice instance management network device is provided, to perform the method according to any one of the third aspect, or the possible implementations of the third aspect. For example, the network device includes a unit configured to perform the method according to any one of the third aspect, or the possible implementations of the third aspect.

According to a tenth aspect, another network slice instance management network device is provided, to perform the method according to any one of the fourth aspect, or the possible implementations of the fourth aspect. For example, the network device includes a unit configured to perform the method according to any one of the fourth aspect, or the possible implementations of the fourth aspect.

According to an eleventh aspect, another network slice instance management network device is provided, to perform the method according to any one of the fifth aspect, or the possible implementations of the fifth aspect. For example, the network device includes a unit configured to perform the method according to any one of the fifth aspect, or the possible implementations of the fifth aspect.

According to a twelfth aspect, another network slice instance management network device is provided, to perform the method according to any one of the sixth aspect, or the possible implementations of the sixth aspect. For example, the network device includes a unit configured to perform the method according to any one of the sixth aspect, or the possible implementations of the sixth aspect.

According to a thirteenth aspect, a network system is provided, where the system includes the network devices according to the seventh aspect and the eighth aspect, or includes the network devices according to the ninth aspect and the tenth aspect, or includes the network devices according to the eleventh aspect and the twelfth aspect.

According to a fourteenth aspect, a network slice instance management network device is provided, where the network device includes a communications interface, a memory, a processor, and a bus system. The communications interface, the memory, and the processor are connected by the bus system. The memory is configured to store an instruction. The processor is configured to execute the instruction stored in the memory, so as to control the communications interface to receive and/or send a signal. In addition, when the processor executes the instruction stored in the memory, the processor performs the method according to any one of the first aspect, or the possible implementations of the first aspect.

According to a fifteenth aspect, a network slice instance management network device is provided, where the network device includes a communications interface, a memory, a processor, and a bus system. The communications interface, the memory, and the processor are connected by the bus system. The memory is configured to store an instruction. The processor is configured to execute the instruction stored in the memory, so as to control the communications interface to receive and/or send a signal. In addition, when the processor executes the instruction stored in the memory, the processor performs the method according to any one of the second aspect, or the possible implementations of the second aspect.

According to a sixteenth aspect, a network slice instance management network device is provided, where the network device includes a communications interface, a memory, a processor, and a bus system. The communications interface, the memory, and the processor are connected by the bus system. The memory is configured to store an instruction. The processor is configured to execute the instruction stored in the memory, so as to control the communications interface to receive and/or send a signal. In addition, when the processor executes the instruction stored in the memory, the processor performs the method according to any one of the third aspect, or the possible implementations of the third aspect.

According to a seventeenth aspect, a network slice instance management network device is provided, where the network device includes a communications interface, a memory, a processor, and a bus system. The communications interface, the memory, and the processor are connected by the bus system. The memory is configured to store an instruction. The processor is configured to execute the instruction stored in the memory, so as to control the communications interface to receive and/or send a signal. In addition, when the processor executes the instruction stored in the memory, the processor performs the method according to any one of the fourth aspect, or the possible implementations of the fourth aspect.

According to an eighteenth aspect, a network slice instance management network device is provided, where the network device includes a communications interface, a memory, a processor, and a bus system. The communications interface, the memory, and the processor are connected by the bus system. The memory is configured to store an instruction. The processor is configured to execute the instruction stored in the memory, so as to control the communications interface to receive and/or send a signal. In addition, when the processor executes the instruction stored in the memory, the processor performs the method according to any one of the fifth aspect, or the possible implementations of the fifth aspect.

According to a nineteenth aspect, a network slice instance management network device is provided, where the network device includes a communications interface, a memory, a processor, and a bus system. The communications interface, the memory, and the processor are connected by the bus system. The memory is configured to store an instruction. The processor is configured to execute the instruction stored in the memory, so as to control the communications interface to receive and/or send a signal. In addition, when the processor executes the instruction stored in the memory, the processor performs the method according to any one of the sixth aspect, or the possible implementations of the sixth aspect.

According to a twentieth aspect, a network system is provided, where the system includes the network devices according to the fourteenth aspect and the fifteenth aspect, or includes the network devices according to the sixteenth aspect and the seventeenth aspect, or includes the network devices according to the eighteenth aspect and the nineteenth aspect.

DESCRIPTION OF EMBODIMENTS

Figure 1:
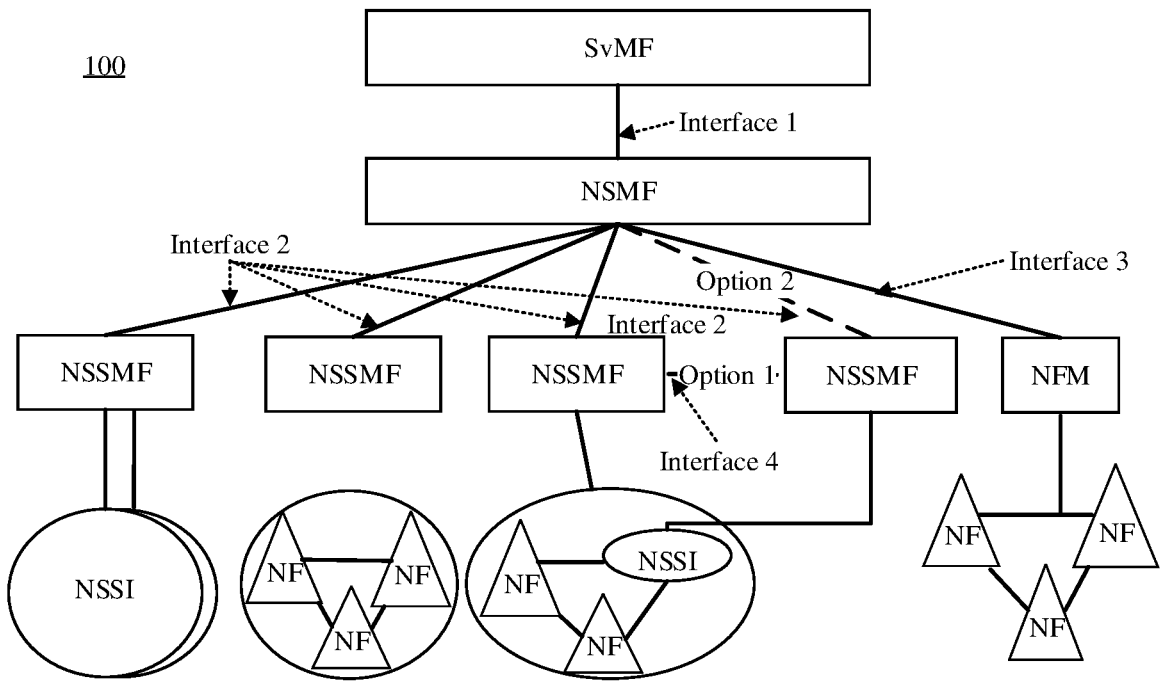
FIG. 1 is a schematic diagram of a network management architecture according to an embodiment.

The following describes the technical solutions in this application with reference to the accompanying drawings.

Before the network slice instance management method, the apparatus, and the system in this application are described, for ease of understanding content of this application, some terms and a network slice management system in the specification are described first.

Network slice: Network slices are different logical networks customized according to different service requirements on a basis of a physical or virtual network infrastructure. The network slice may be a complete end-to-end network including a terminal, an access network, a transport network, a core network, and an application server, can provide a telecommunication service, and has a specific network capability. The network slice may also be any combination of the terminal, the access network, the transport network, the core network, and the application server. For example, the network slice includes only the access network and the core network. The network slice may have one or more of the following features: The access network may or may not be sliced, the access network may be shared by a number of network slices, and features of different network slices may be different from those of network functions of the different network slices.

Network slice instance (NSI): A network slice instance is an actual real-world logical network that can meet a specific network feature or service requirement. One network slice instance may provide one or more types of services. The network slice instance may be created by a network management system. One network management system may create a number of network slice instances and manage them at the same time, including performance monitoring, fault management, and the like in a running process of the network slice instance. When a number of network slice instances coexist, the network slice instances may share some network resources and network functions. The network slice instance may or may not be created from a network slice template. A complete network slice instance can provide a complete end-to-end network service, and a network slice instance may include a network slice subnet instance and/or a network function. The network function may include a physical network function and/or a virtual network function. The physical network function and the virtual network function are hereinafter collectively referred to as the network function.

Network slice subnet instance: A network slice subnet instance may not need to provide a complete end-to-end network service, and may be a set of network functions of a same equipment vendor in a network slice instance, or may be a set of network functions that is classified by domain, for example, a network slice subnet instance of a core network and a network slice subnet instance of an access network, or may be a set of network functions that is classified in other manners. The network slice subnet instance may be shared by a number of network slice instances. The network slice subnet instance is proposed to facilitate management of a network management system. One network slice instance may include several network slice subnet instances, and each network slice subnet instance includes several network functions and/or several network slice subnet instances; one network slice instance may include several network slice subnet instances and a network function that is not grouped into a network slice subnet instance; or one network slice instance may include only several network functions.

Network function: A network function is a processing function of a network, and defines a functional behavior and an interface. The network function may be implemented by dedicated hardware, or may be implemented by running software on dedicated hardware, or may be implemented on a general purpose hardware platform in a form of a virtual function. Therefore, from a perspective of implementation, network functions may be classified into physical network functions and virtual network functions, while from a perspective of usage, the network functions may be classified into dedicated network functions and shared network functions. For example, if a number of (sub-) network slice instances can independently use different network functions, these network functions are referred to as dedicated network functions, and if the number of (sub-) network slice instances can share a same network function, this network function is referred to as a shared network function.

Automatic network slice optimization: indicates that an NSI can automatically modify a configuration when continuously providing services, so as to adapt to traffic, a topology, a network resource, a service status, and the like that change dynamically. A network slice management system monitors several parameters of a network slice instance, and automatically modifies an NSI-related configuration within an allowed range, to improve overall performance. The concept of automatic network slice optimization involves automatic network slice orchestration and management, to avoid impact on a service to a greatest extent and reduce human participation as much as possible.

FIG. 1 is a schematic diagram of a network management architecture 100 according to an embodiment of this application. Functions and interfaces of modules in FIG. 1 are described as follows:

Service management function module (SvMF): It is responsible for converting a telecommunication service requirement of an operator and/or a third-party customer into a network slice requirement, sending the network slice requirement to a network slice management function module (NSMF), receiving a subscription requirement of the operator and/or third-party customer for network slice management data (for example, performance data, fault data, and fault rectification data), obtaining the network slice management data from the NSMF, and the like.

Network slice management function module (NSMF): It is responsible for receiving a network slice requirement sent by an SvMF, managing a life cycle, performance, a fault, and the like of a network slice instance (life cycle, performance, and fault management is hereinafter referred to as management), orchestrating composition of the network slice instance, dividing a network slice instance requirement into network slice subnet instance requirements, sending a network slice subnet instance management request to each NSSMF, and sending a network function management request to an EM.

Network slice subnet management function module (NSSMF): It receives a network slice subnet instance requirement from an NSMF, so as to manage a life cycle, performance, a fault, and the like of a network slice subnet instance (life cycle, performance, and fault management is hereinafter referred to as management), and orchestrates composition of a network slice subnet instance.

Network function management module (NFM): It is a logic entity used to manage an network function, may be independent of the network function or may be located in the network function or another function module, and is configured to manage the network function, for example, managing a life cycle of the network function, configuring a function parameter of the network function, allocating a network resource to the network function, and the like.

Interface 1: It is an interface between an SvMF and an NSMF, and is used by the SvMF to send a network slice requirement of a service to the NSMF, and is used by the NSMF to feed running statuses of an NSI and the service back to the SvMF, and to provide specific management data for the SvMF.

Interface 2: It is an interface between an NSMF and an NSSMF. When managing and orchestrating an NSI, the NSMF transfers an NSSI requirement to the NSSMF through this interface, for example, creating, modifying, and obtaining management data. The NSSMF feeds back NSSI related information to the NSMF through this interface.

Interface 3: It is an interface between an NSMF and an NFM, and is applicable to a scenario in which the NSMF can sense and manage a network function. For example, the NSMF interacts with the NFM and sends a network function management and configuration command through this interface, and the NFM receives a message from the NSMF through this interface and feeds back network function related information through this interface.

Interface 4: It is an interface between NSSMFs, and is used for mutual coordination between the NSSMFs. An NSSMF requests, through this interface, another NSSMF to manage an NSSI governed by the NSSMF, including life cycle management, performance management, fault management, and the like.

In addition, FIG. 1 further illustrates several manners of NSI composition: An NSI includes several NSSIs, an NSI includes several NSSIs and several network functions, and an NSI includes several network functions.

The solutions in this application may be applicable to two scenarios. One scenario is that the NSMF manages only the NSSMF, and cannot perceive network function information, and cannot manage a network function either. The other scenario is that the NSMF may perceive and directly manage a network function like a conventional network management system, or may perceive and manage an NF by using another new network function management function. For example, in the network management architecture 200 shown in FIG. 2, the NSMF may directly manage a network function by using the network function management module NFM.

Figure 2:
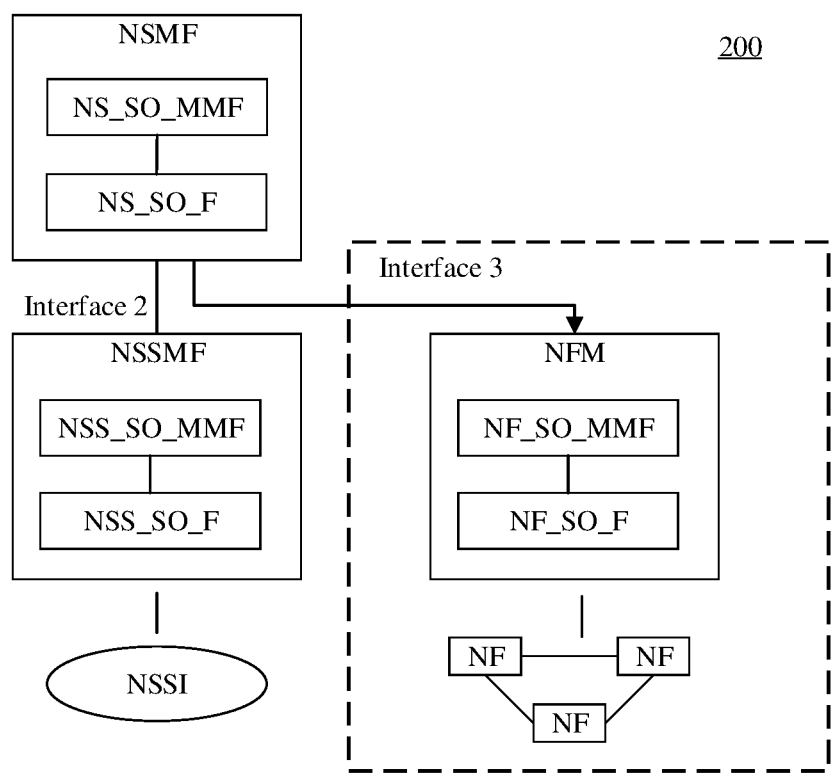
FIG. 2 is a schematic diagram of a network management architecture according to another embodiment.

FIG. 2 is a schematic structural diagram of a network management architecture 200 according to an embodiment of this application. As shown in FIG. 2, the network management architecture 200 may be used to manage a network slice instance. Functions of modules of the network management architecture 200 may be the same as or similar to the functions of the modules corresponding to the network management architecture 100. The following describes the modules of the network management architecture 200.

A. Network slice self-optimization monitoring and management module (NS_SO_MMF): This module may include but is not limited to at least one of the following functions:

receiving a network slice self-optimization policy from an operator;

generating a related parameter required by an NSI self-optimization function, mainly including an NSI parameter that needs to be monitored, a threshold for triggering self-optimization, and an NSI self-optimization range;

monitoring and managing the NSI self-optimization function; or communicating with an NSS_SO_MMF, to provide an optimization policy for an NSSI self-optimization function, learn of a running status of the NSSI self-optimization function, and obtain an NSSI self-optimization result.

B. Network slice subnet self-optimization monitoring and management module (NSS_SO_MMF): This module may include but is not limited to at least one of the following functions:

communicating with an NS_SO_MMF, to receive an optimization policy of an NSSI self-optimization function, and report a running status of the NSSI self-optimization function and a related self-optimization result;

determining, based on an NSSI status, to perform self-optimization within the NSSI instead of coordinating with the NS_SO_MMF, where an internal action is involved in this case;

generating a related parameter required by the NSSI self-optimization function, mainly including an NSSI parameter that needs to be monitored, a threshold for triggering self-optimization, and an NSSI self-optimization range; or monitoring and managing the NSSI self-optimization function.

C. Network function self-optimization monitoring and management function module (NF_SO_MMF): This module may include but is not limited to at least one of the following functions:

communicating with an NS_SO_MMF, to receive an optimization policy of an NF self-optimization function, and report a running status of the NF self-optimization function;

generating a related parameter required by the NF self-optimization function, mainly including an NF parameter that needs to be monitored, a threshold for triggering self-optimization, and an NF self-optimization range; or monitoring and managing the NF self-optimization function.

D. Network slice self-optimization function module (NS_SO_F): This module may include but is not limited to at least one of the following functions:

communicating with an NS_SO_MMF, to receive an NSI self-optimization policy and feedback a self-optimization result;

executing an NSI self-optimization algorithm; or adjusting an NSI configuration based on an output result of the NSI self-optimization algorithm.

E. Network slice subnet self-optimization function module (NSS_SO_F): This module may include but is not limited to at least one of the following functions:

communicating with an NSS_SO_MMF, to receive an NSSI self-optimization policy and feedback a self-optimization result;

executing an NSSI self-optimization algorithm; or adjusting an NSSI configuration based on an output result of the NSSI self-optimization algorithm.

F. Network function self-optimization module (NF_SO_F): This module may include but is not limited to at least one of the following functions:

communicating with an NF_SO_MMF, to receive an NF self-optimization policy and feedback a self-optimization result;

executing an NF self-optimization algorithm; or adjusting an NF parameter configuration and an NF resource configuration based on an output result of the NF self-optimization algorithm.

It should be noted that the functions of the NSFM, the NSSMF, and the NFM in FIG. 2 may be the same as or similar to functions of corresponding modules in FIG. 1. An interface 2 and an interface 3 in FIG. 2 may be corresponding interfaces in FIG. 1. The NSMF may include the NS_SO_MMF, the NSSMF may include the NSS_SO_MMF, and the NFM may include the NF_SO_MMF.

Optionally, NSSI nesting can be allowed, that is, one NSSI includes another NSSI, and both the NSSIs may have their respective NSSMFs. It is assumed that an NSI includes an NSSI 1, the NSSI 1 includes an NSSI 2, and an NSSMF 1 and an NSSMF 2 are managers of the NSSI 1 and the NSSI 2, respectively. In this case, there are two options for managing the NSSI 2. In Option 1, the NSSMF 1 and the NSSMF 2 alternately manage the NSSI 2, and this option is applicable to a scenario in which there is a direct interface between the NSSMF 1 and the NSSMF 2. In Option 2, an NSMF manages the NSSI 2.

Figure 3:
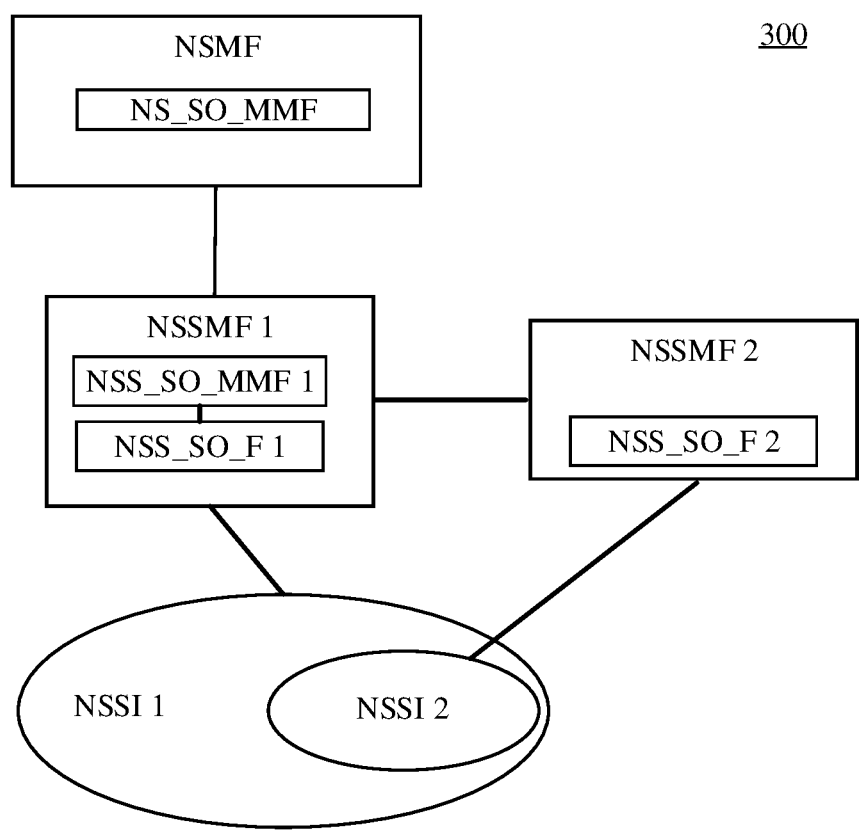
FIG. 3 is a schematic diagram of a network management architecture according to another embodiment.
Figure 4:
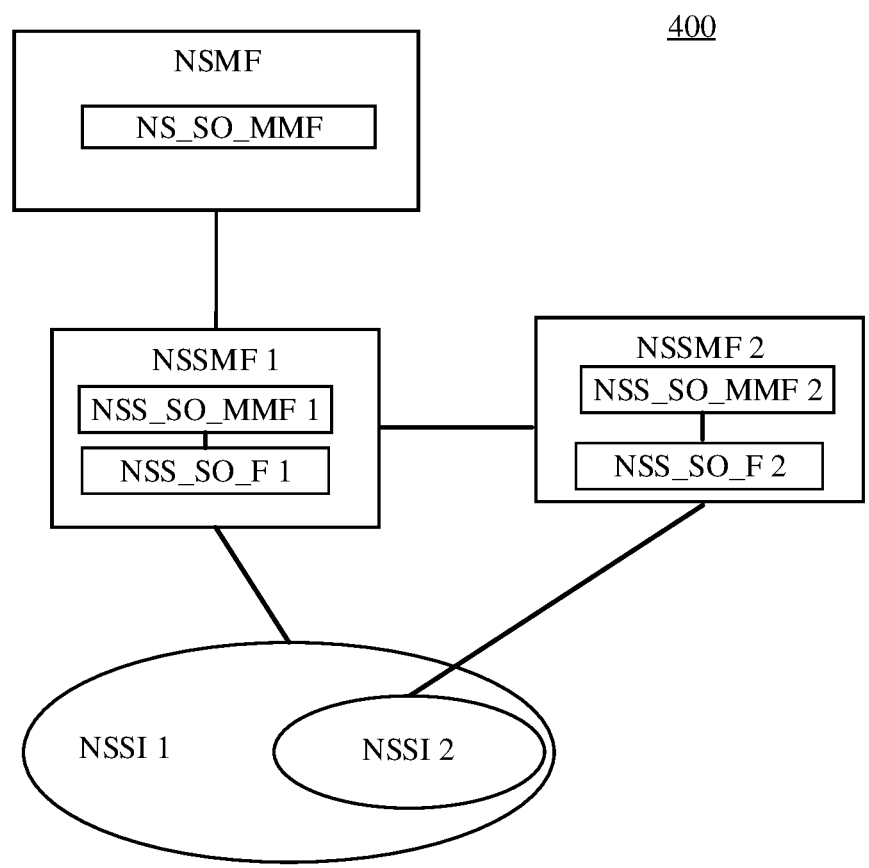
FIG. 4 is a schematic diagram of a network management architecture according to another embodiment.
Figure 5:
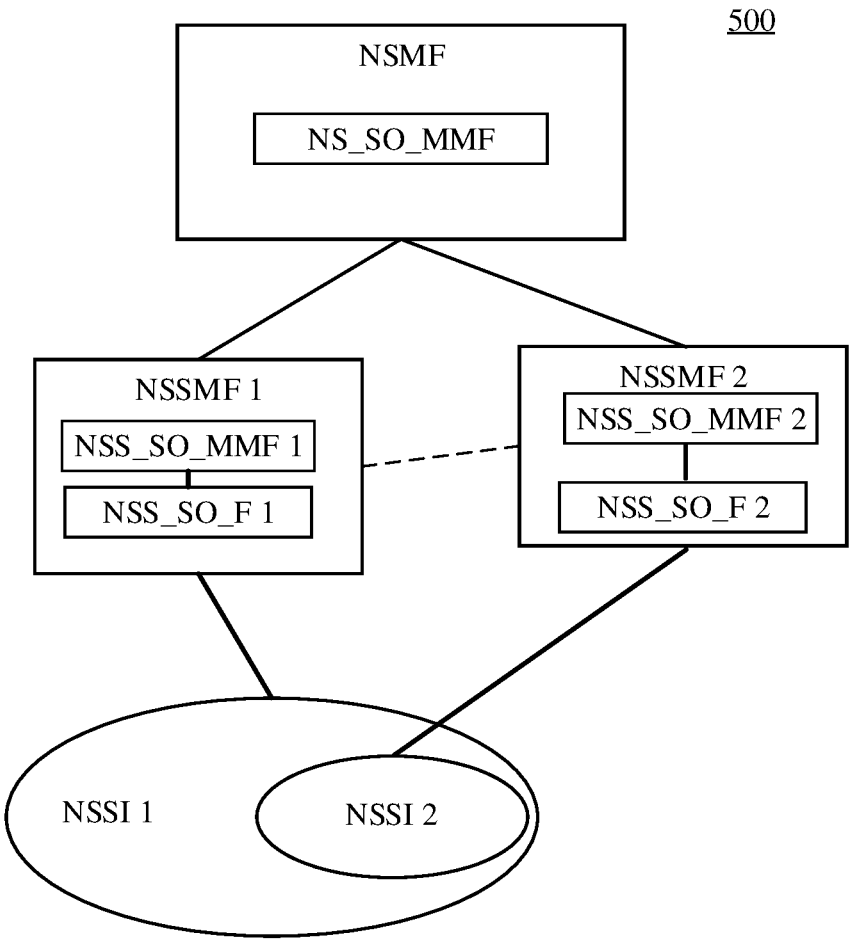
FIG. 5 is a schematic diagram of a network management architecture according to another embodiment.

FIG. 3 to FIG. 5 separately show three network management architectures according to the embodiments of this application for a case in which NSSI nesting is allowed.

FIG. 3 is a schematic structural diagram of a network management architecture 300 according to an embodiment of this application. As shown in FIG. 3, an NSS_SO_F 2 of a nested NSSI is managed by an NSS_SO_MMF 1 of an upper-layer NSSI, and the NSS_SO_MMF 1 of the upper-layer NSSI is managed by an NS_SO_MMF.

In the network management architecture 300, when sending a self-optimization policy related to an NSSI 1 to the NSS_SO_MMF 1, the NS_SO_MMF may also send a self-optimization policy of an NSSI 2. The self-optimization policy of the NSSI 2 may also be generated by the NSS_SO_MMF 1. The NSS_SO_MMF 1 may configure the NSS_SO_F 2.

FIG. 4 is a schematic structural diagram of a network management architecture 400 according to an embodiment of this application. As shown in FIG. 4, an NSS_SO_F 2 of a nested NSSI may be directly managed by an NSS_SO_MMF 2. The NSS_SO_MMF 2 receives a policy from an NSS_SO_MMF 1.

In the network management architecture 400, when sending a self-optimization policy related to an NSSI 1 to the NSS_SO_MMF 1, an NS_SO_MMF may also send a self-optimization policy of an NSSI 2 (The self-optimization policy of the NSSI 2 may also be generated by the NSS_SO_MMF 1). The NSS_SO_MMF 1 sends the self-optimization policy of the NSSI 2 to the NSS_SO_MMF 2. Interaction between the NSS_SO_MMF 1 and the NSS_SO_MMF 2 includes sending the self-optimization policy of the NSSI 2, obtaining a running status of a self-optimization function of the NSSI 2, and obtaining a self-optimization result of the NSSI 2.

FIG. 5 is a schematic structural diagram of a network management architecture 500 according to an embodiment of this application. As shown in FIG. 5, an NSS_SO_F 2 of a nested NSSI is managed by an NSS_SO_MMF 2 of the NSSI, and the NSS_SO_MMF 2 of the NSSI may be managed by an NS_SO_MMF. In addition, there may be some coordination relationships between the NSS_SO_MMF 2 and an NSS_SO_MMF 1, because after automatic optimization of the nested NSSI, an optimization result may need to be informed to an upper-layer NSSI.

In the network management architecture 500, the NS_SO_MMF may directly send a self-optimization policy related to an NSSI 2 to the NSS_SO_MMF 2.

In addition, it should be noted that the foregoing function modules and units are described from a perspective of their functions. In actual applications, the foregoing function modules may exist alone physically, or two or more devices may be integrated into one unit. For example, the NS_SO_MMF module and the NS_SO_F module may be combined into one function module, and the function module has all the functions of the NS_SO_MMF module and the NS_SO_F module. Alternatively, the NS_SO_MMF module and the NS_SO_F module may be independent modules and communicate with each other through an interface between the modules. Any equivalent variation or replacement readily figured out by persons of ordinary skill in the art within the technical scope disclosed in the embodiments of the present invention shall fall within the protection scope of the present invention.

The foregoing describes the network management architecture according to the embodiments of this application. The following describes a network slice instance management method, an apparatus, and a system according to the embodiments of this application with reference to the accompanying drawings.

Figure 6:
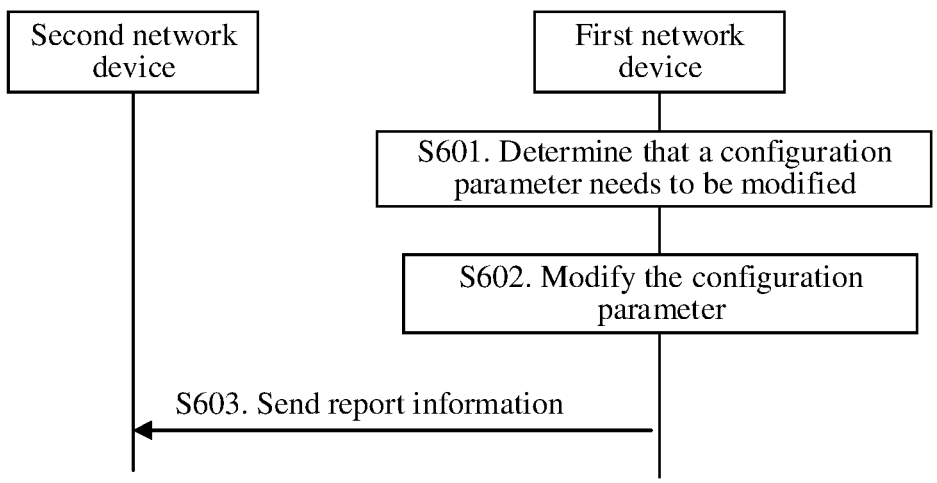
FIG. 6 is a schematic diagram of a network slice instance management method according to an embodiment.

FIG. 6 is a schematic flowchart of a network slice instance management method 600 according to an embodiment of this application. The method 600 may be applied to any one of the network management architectures shown in FIG. 1 to FIG. 5. Optionally, in FIG. 6, a first network device may be an NSSMF module or an NSS_SO_MMF module, and the NSSMF module may include an NSS_SO_MMF module and an NSS_SO_F module. A second network device may be an NSMF module or an NS_SO_MMF module.

As shown in FIG. 6, the method 600 includes the following steps.

In step S601, the first network device determines that a configuration parameter of a first network slice subnet instance needs to be modified, where the first network device is configured to manage the first network slice subnet instance.

In step S602, the first network device modifies the configuration parameter of the first network slice subnet instance.

Optionally, the configuration parameter of the first network slice subnet instance may include a capacity size, a capability parameter, a location parameter, a topology parameter, a function parameter, and the like of the first network slice subnet instance. This is not limited in this application.

Optionally, in this embodiment of this application, the modifying the configuration parameter of the first network slice subnet instance may also be referred to as performing self-optimization on the first network slice subnet instance.

Modification of an NSSI capacity size may be modification of a total quantity of users supported by an NSSI, a maximum quantity of connections on a control plane, a maximum quantity of PDU connections, total bandwidth, and the like. Modification of an NSSI capability parameter may be modification of some network features, for example, high mobility, medium mobility, or low mobility support and high latency, medium latency, or low latency support. When the first network device specifically modifies an NSSI, a modification action may include adding a network function, deleting a network function, or updating a network function feature.

In step S603, the first network device sends report information to the second network device, where the report information is used to indicate a result of modifying the configuration parameter of the first network slice subnet instance, the second network device is configured to manage a first network slice instance, and the first network slice instance includes the first network slice subnet instance.

Optionally, the indicating, by the report information, a result of modifying the configuration parameter of the first network slice subnet instance may also be referred to as indicating, by the report information, a result of performing self-optimization on the first network slice subnet instance.

Optionally, the report information may include information such as an identifier of the first network slice instance, an identifier of the first network slice subnet instance, and a modified configuration parameter. For example, the modified configuration parameter may include information such as a modified capacity size and a modified capability parameter.

In this embodiment of this application, the first network device managing the first network slice subnet instance may independently determine that the configuration parameter of the first network slice subnet instance needs to be modified, and report the result of modifying the configuration parameter of the first network slice subnet instance to the second network device. In this way, network slice instances can be flexibly managed, thereby improving efficiency of network slice instance management.

Optionally, the determining, by the first network device, that a configuration parameter of a first network slice subnet instance needs to be modified includes: receiving, by the first network device, a self-optimization policy from the second network device, where the self-optimization policy is used to indicate a rule of modifying a network slice subnet instance; and the modifying, by the first network device, the configuration parameter of the first network slice subnet instance includes: modifying, by the first network device, the configuration parameter of the first network slice subnet instance based on the self-optimization policy.

Optionally, the second network device may determine and obtain a self-optimization policy of each NSSI based on an entire NSI self-optimization policy, and send the self-optimization policy of each NSSI to a corresponding NSS_SO_MMF. Content of the self-optimization policy may include at least one of the following: an NSI identifier for indicating an NSI to which the self-optimization policy belongs, an NSSI identifier for indicating an NSSI to which the self-optimization policy is applied, a parameter threshold for triggering optimization, or an adjustment range allowed for an NSSI capacity.

Optionally, the second network device may receive an NSI self-optimization policy from another management module (for example, an SvMF or a policy management module) provided by an operator, and send a self-optimization policy to the first network device based on the NSI self-optimization policy. The NSI self-optimization policy may be a self-optimization policy sent by the operator. The NSI self-optimization policy may include at least one of the following: whether NSI self-optimization is allowed, a self-optimization function allowed to operate, a trigger condition of a self-optimization function, a valid range of a self-optimization parameter, whether to obtain confirmation before optimization, whether to feed back an optimization result, and the like.

Optionally, the method 600 further includes: receiving, by the first network device, authorization information from the second network device, where the authorization information is used to indicate permission for modifying the configuration parameter of the first network slice subnet instance.

For example, the authorization information may be operator authorization information. Before modifying an NSSI configuration parameter, the first network device may obtain operator authorization via the second network device. For example, the first network device informs the operator of a to-be-made modification to an NSSI capacity, to determine whether the modification is allowed.

Figure 7:
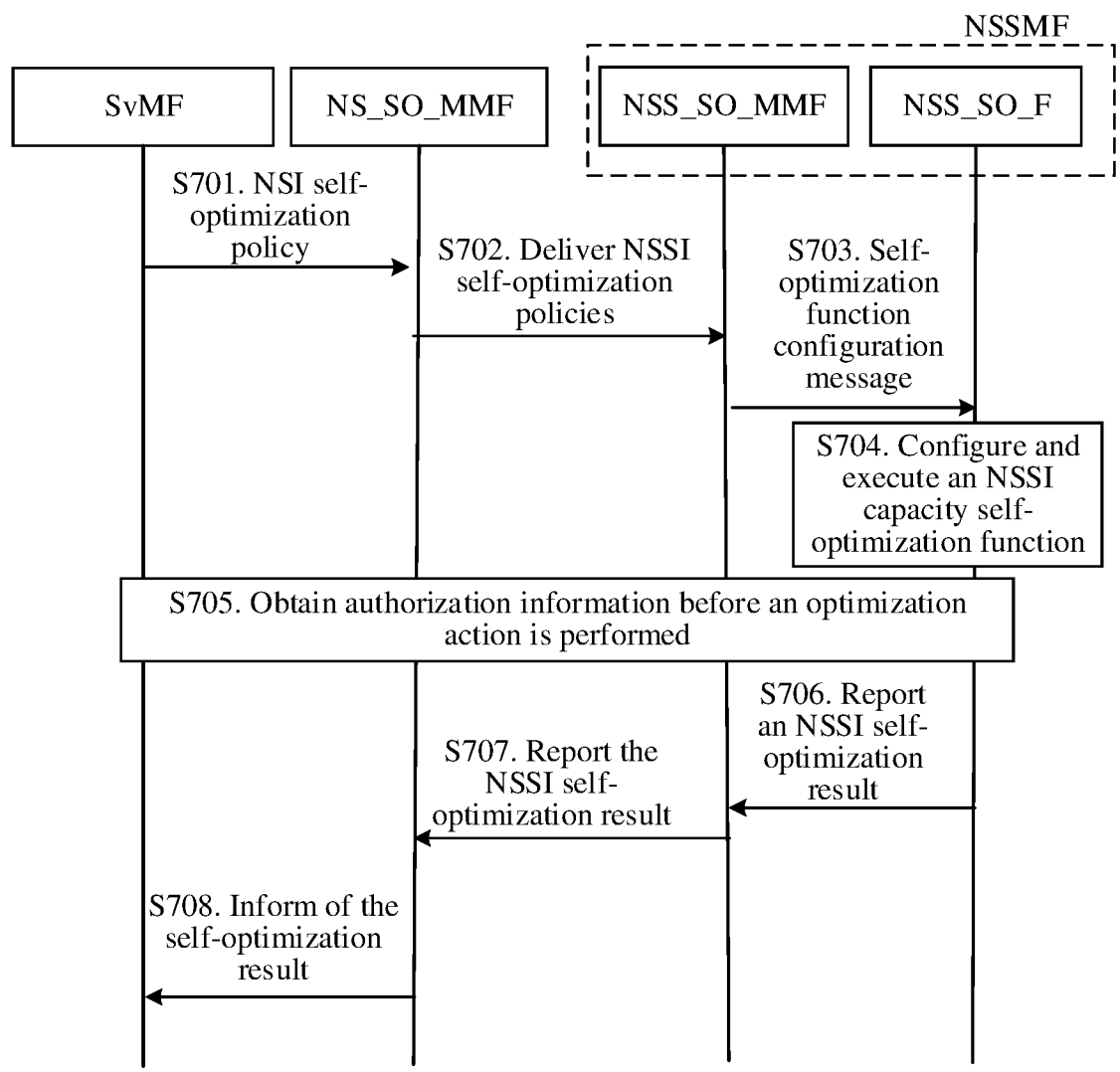
FIG. 7 is a schematic diagram of a network slice instance management method according to another embodiment.

In an example, FIG. 7 is a schematic flowchart of a network slice instance management method 700 according to an embodiment of this application. The example in FIG. 7 provides a process of automatically optimizing an NSSI capacity size by an NSSMF. In FIG. 7, the second network device in the method 600 may be an NS_SO_MMF module, and the first network device in the method 600 may be an NSS_SO_MMF module or an NSSMF module. The NSSMF module includes an NSS_SO_MMF module and an NSS_SO_F module.

As shown in FIG. 7, the method 700 includes the following steps.

In step S701, the NS_SO_MMF receives an NSI self-optimization policy from an SvMF or another policy management module. The NSI self-optimization policy may be a self-optimization policy sent by an operator. The NSI self-optimization policy may include at least one of the following: for example, whether NSI self-optimization is allowed, a trigger condition of a self-optimization function, a valid range of a self-optimization parameter, a self-optimization function allowed to operate, whether to obtain confirmation before optimization, or whether to feed back an optimization result.

In step S702, the NS_SO_MMF determines and obtains a self-optimization policy of each NSSI based on the entire NSI self-optimization policy, and sends the self-optimization policy of each NSSI to the NSS_SO_MMF. Content of the self-optimization policy may include at least one of the following: an NSI identifier for indicating an NSI to which the self-optimization policy belongs, an NSSI identifier for indicating an NSSI to which the self-optimization policy is applied, a parameter threshold for triggering optimization, or an adjustment range allowed for an NSSI capacity.

In step S703, the NSS_SO_MMF sends a self-optimization function configuration message to the NSS_SO_F, where the self-optimization function configuration message may include the NSSI identifier, a trigger condition for automatic NSSI capacity optimization, and an NSSI capacity adjustment range. An NSSI capacity may be measured by parameters such as a quantity of supported users, a quantity of supported connections, and total bandwidth. Optionally, when the NSS_SO_MMF and the NSS_SO_F are set on a same network device, this step may be considered as internal interaction of the network device.

In step S704, the NSS_SO_F modifies an NSSI capacity size, in other words, the NSS_SO_F performs NSSI self-optimization.

In step S705, before NSSI self-optimization is performed, the NS_SO_MMF and the NSS_SO_MMF obtain authorization information from the SvMF, where the authorization information may be authorization information sent by an operator. For example, the SvMF or another policy management module may be used to inform the operator that an NSI configuration parameter is to be modified, and request the operator to determine whether the modification is allowed.

In step S706, the NSS_SO_F reports a self-optimization result to the NSS_SO_MMF.

In step S707, the NSS_SO_MMF reports the self-optimization result to the NS_SO_MMF, where the self-optimization result may include the NSI ID, the NSSI ID, and a modified NSSI capacity.

In step S708, the NS_SO_MMF reports report information to the SvMF or another policy management module, where the report information is used to indicate a result of modifying an NSSI configuration parameter or the self-optimization result. The report information may include information about the NSI ID, the NSSI ID, or the modified NSSI capacity size.

In this embodiment of this application, a requirement of an NSI for automatic capacity adjustment of an NSSI of the NSI can be met by controlling an automatic capacity optimization function of the NSSI by the NS_SO_MMF. This improves flexibility of NSI and NSSI management, and then improves efficiency of NSI management.

In this embodiment of this application, when NSSI capacity occupancy reaches a specific threshold, the NSSMF may automatically determine to increase or decrease the capacity, to optimize performance and improve resource utilization.

Figure 8:
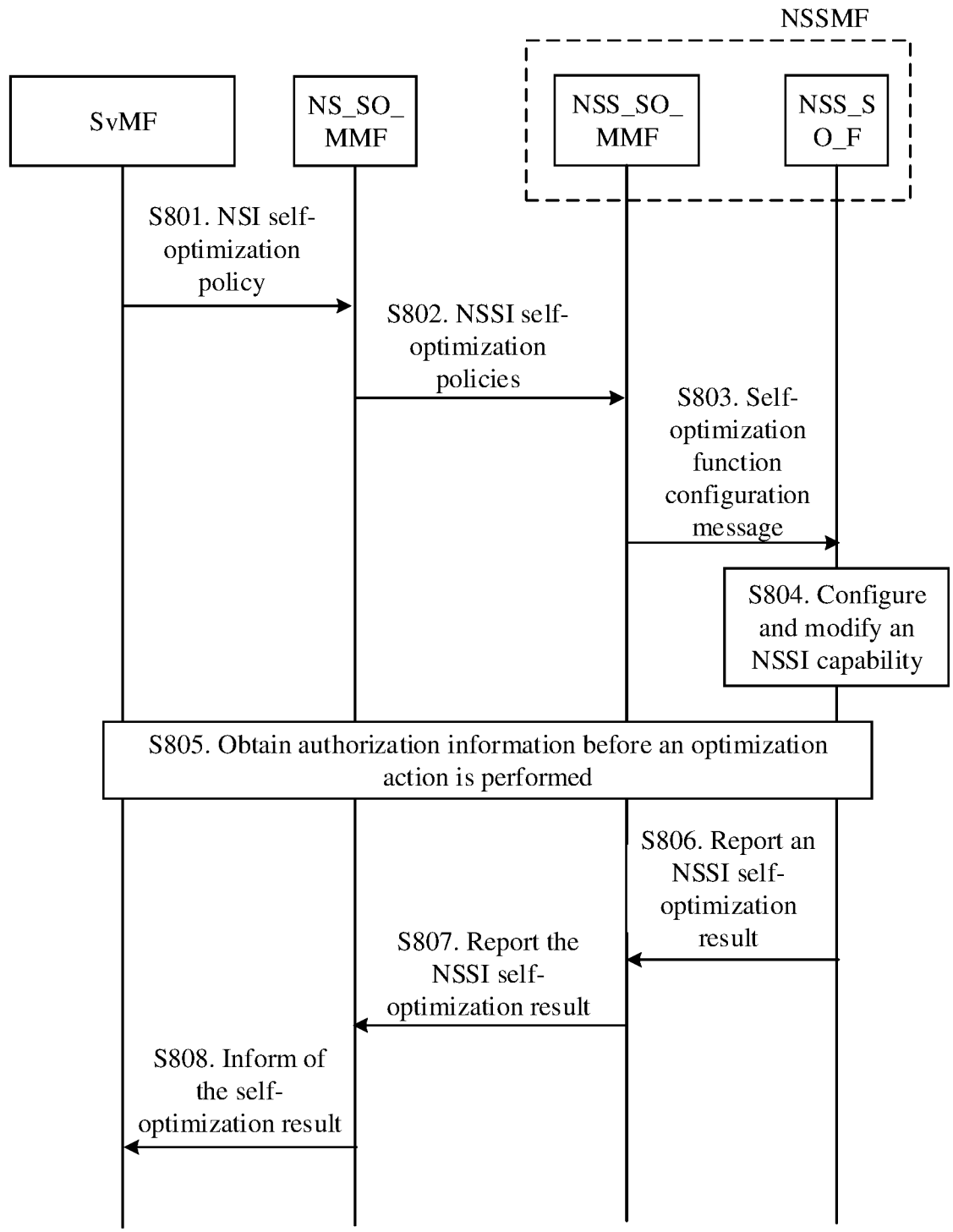
FIG. 8 is a schematic diagram of a network slice instance management method according to another embodiment.

In an example, FIG. 8 is a schematic flowchart of a network slice instance management method 800 according to another embodiment of this application. The method 800 provides a process of automatically optimizing an NSSI capability parameter by an NSSMF. In FIG. 8, the second network device in the method 600 may be an NS_SO_MMF module, and the first network device in the method 600 may be an NSS_SO_MMF module or an NSSMF module. The NSSMF module includes an NSS_SO_MMF module and an NSS_SO_F module.

As shown in FIG. 8, the method 800 includes the following steps.

In step S801, the NS_SO_MMF receives an NSI self-optimization policy from an SvMF or another policy management module. The NSI self-optimization policy may be a self-optimization policy sent by an operator. The NSI self-optimization policy may include at least one of the following: for example, whether NSI self-optimization is allowed, a self-optimization function allowed to operate, whether to obtain confirmation before optimization, or whether to feed back an optimization result.

In step S802, the NS_SO_MMF determines and obtains a self-optimization policy of each NSSI based on the entire NSI self-optimization policy, and sends the self-optimization policy of each NSSI to the NSS_SO_MMF. Content of the self-optimization policy may include at least one of the following: an NSI identifier for indicating an NSI to which the self-optimization policy belongs, an NSSI identifier for indicating an NSSI to which the self-optimization policy is applied, a parameter threshold for triggering self-optimization, or an adjustment option allowed for an NSSI capability parameter.

For example, the NSSI may automatically adjust support of mobility such as high mobility, medium mobility, and low mobility based on a determining result of a user mobility feature. A capability adjustment option may be a combination, for example, adjustment between a high mobility-medium delay and a medium mobility-low delay.

In step S803, the NSS_SO_MMF sends a self-optimization function configuration message to the NSS_SO_F, where the self-optimization function configuration message may include the NSSI identifier, a trigger condition for automatic NSSI capacity optimization, and an NSSI capability adjustment option. NSSI capability modification means adding or deleting several NFs or modifying a related NF feature or the like by the NSSMF.

In step S804, the NSS_SO_F modifies an NSSI capability parameter, or the NSS_SO_F performs self-optimization.

In step S805, before NSSI self-optimization is performed, the NS_SO_MMF and the NSS_SO_MMF obtain authorization information from the SvMF, where the authorization information may be authorization information sent by an operator. For example, the SvMF or another policy management module may be used to inform the operator that an NSI configuration parameter is to be modified, and request the operator to determine whether the modification is allowed.

In step S806, the NSS_SO_F reports a self-optimization result to the NSS_SO_MMF.

In step S807, the NSS_SO_MMF reports the self-optimization result to the NS_SO_MMF, where the self-optimization result may include the NSI ID, the NSSI ID, and a modified NSSI capability parameter.

In step S808, the NS_SO_MMF reports report information to the SvMF or the another policy management module, where the report information is used to indicate a result of modifying a capability parameter of the first network slice subnet instance or the self-optimization result, and the report information may include the NSI ID, the NSSI ID, and the modified NSSI capability parameter.

In this embodiment, a requirement of an NSI for automatic capability adjustment of a composition NSSI can be met by controlling an automatic capability optimization function of the NSSI by the NS_SO_MMF. This improves flexibility of NSI and NSSI management, and then improves efficiency of NSI management.

In this embodiment, when detecting that an NSSI capability may be reduced as appropriate, the NSSMF may automatically modify the NSSI capability to reduce overheads of computing and storage resources and the like on a network. When detecting that a service can be better supported by modifying the NSSI capability, the NSSMF automatically modifies the NSSI capability to optimize support of an entire network slice instance for the service.

Figure 9:
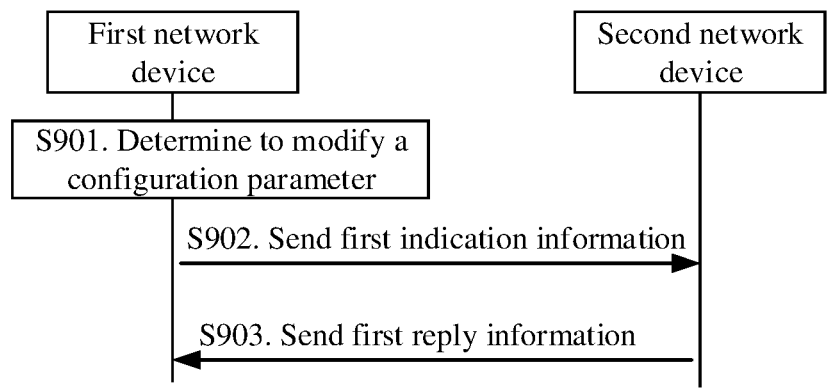
FIG. 9 is a schematic diagram of a network slice instance management method according to another embodiment.

FIG. 9 is a schematic flowchart of a network slice instance management method 900 according to an embodiment of this application. The method 900 may be applied to any one of the network management architectures shown in FIG. 1 to FIG. 5. Optionally, in the example in FIG. 9, a first network device may be an NSMF module or an NS_SO_MMF module. The NSMF module may include an NS_SO_MMF module and an NS_SO_F module. A second network device may be an NSSMF module or an NSS_SO_MMF module. A third network device may be an SvMF or another policy management module.

As shown in FIG. 9, the method 900 includes the following steps.

In step S901, the first network device determines to modify a configuration parameter of a first network slice instance, where the first network slice instance includes at least one network slice subnet instance.

Optionally, the first network device may be configured to manage the first network slice instance. For example, the first network device may be the foregoing NSMF module, or the NS_SO_MMF module of the NSMF module.

Optionally, the first network slice instance may include the at least one network slice subnet instance. Modification of the configuration parameter of the first network slice instance may be correspondingly understood as modification of the at least one network slice subnet instance.

Optionally, the configuration parameter of the first network slice instance includes at least one of the following: a capacity size, a capability parameter, a location parameter, a topology parameter, a function parameter, and the like of the first network slice instance.

In step S902, the first network device sends first indication information to at least one second network device, where the first indication information is used to instruct the at least one second network device to modify a configuration parameter of the at least one network slice subnet instance.

Optionally, the configuration parameter of the network slice subnet instance may include a capacity size of the network slice subnet instance and a capability parameter of the network slice subnet instance.

Optionally, in this embodiment, modifying the configuration parameter of the network slice instance may also be referred to as performing self-optimization on the network slice instance. Modifying the configuration parameter of the network slice subnet instance may also be referred to as performing self-optimization on the network slice subnet instance.

Optionally, modification of an NSSI capacity size is modification of, for example, a total quantity of users that can be supported by an NSSI, a maximum quantity of connections on a control plane, a maximum quantity of PDU connections, and total bandwidth. Modification of an NSSI capability parameter may be modification of some network features, for example, high mobility, medium mobility, or low mobility support and high latency, medium latency, or low latency support. When the second network device specifically modifies an NSSI, a modification action may include adding a network function, deleting a network function, or updating a network function feature.

In step S903, the first network device receives first reply information from the at least one second network device, where the first reply information is used to indicate a result of modifying the configuration parameter of the at least one network slice subnet instance.

In this embodiment, the first network device may independently determine to modify the first network slice instance, where the first network slice instance includes the at least one network slice subnet instance, and send the first indication information to the second network device managing a first network slice subnet instance, to modify the network slice subnet instance. This can flexibly modify a network slice instance, thereby improving efficiency of network slice instance management.

Optionally, the method 900 further includes: obtaining, by the first network device, current configuration information of the at least one network slice subnet instance from the at least one second network device; and the determining, by the first network device, to modify a configuration parameter of a first network slice instance includes: determining, by the first network device based on the current configuration information of the at least one network slice subnet instance, to modify the configuration parameter of the first network slice instance.

Optionally, the first network device may send request information to the second network device, where the request information is used to instruct the second network device to send the current configuration information of the network slice subnet instance to the first network device. Alternatively, the second network device may periodically send the current configuration information of the network slice subnet instance to the first network device.

Optionally, the first network device may compare the current configuration information of the network slice subnet instance with a preset rule, to determine whether to modify the configuration parameter of the network slice subnet instance. The preset rule may be the following self-optimization policy.

For example, when the configuration parameter of the network slice subnet instance is a capacity size, the first network device may send a request to the second network device to request an NSSI capacity size. It is specified that the NSSMF reports an occupied capacity periodically or when an occupied capacity of a network slice subnet reaches a specific threshold. When an NSI includes a number of NSSIs, a number of NSSMFs are requested, to obtain capacity occupancy of each NSSI.

Optionally, the method 900 further includes: receiving, by the first network device, a self-optimization policy from the third network device, where the self-optimization policy is used to indicate a rule of modifying a network slice instance; and the determining, by the first network device, to modify a configuration parameter of a first network slice instance includes: modifying, by the first network device, the configuration parameter of the first network slice instance based on the self-optimization policy.

Optionally, the third network device may be an SvMF module, or may be an operator server or another network management module.

The self-optimization policy may be a self-optimization policy sent by an operator. The self-optimization policy may include at least one of the following: whether NSI self-optimization is allowed, a self-optimization function allowed to operate, a trigger condition of a self-optimization function, a valid range of a self-optimization parameter, whether to obtain confirmation before optimization, whether to feed back an optimization result, and the like.

Optionally, the method 900 further includes: sending, by the first network device, report information to the third network device, where the report information is used to indicate a result of modifying the configuration parameter of the first network slice instance.

Optionally, the indicating, by the report information, a result of modifying the configuration parameter of the first network slice subnet instance may also be referred to as indicating, by the report information, a result of performing self-optimization on the first network slice subnet instance.

Optionally, the report information may include information such as an identifier of the first network slice instance, an identifier of the first network slice subnet instance, and a modified configuration parameter. For example, the modified configuration parameter may include information such as a modified capacity size and a modified capability parameter.

Figure 10:
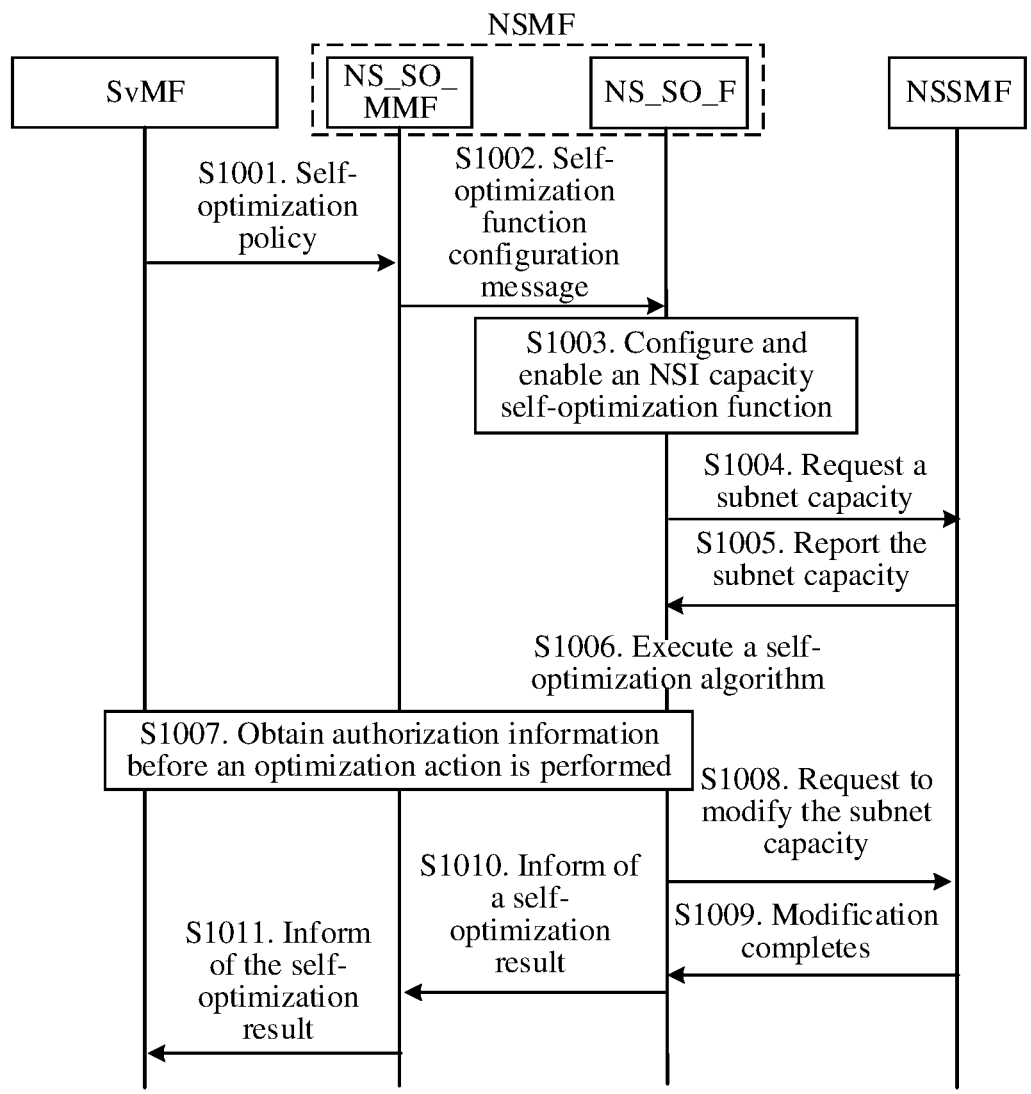
FIG. 10 is a schematic diagram of a network slice instance management method according to another embodiment.

For example, FIG. 10 is a schematic flowchart of a network slice instance management method 1000 according to an embodiment of this application. The example in FIG. 10 provides a process of automatically optimizing an NSI capacity size by an NSMF. In FIG. 10, the first network device in the method 900 may be an NS_SO_MMF module or an NSMF module in FIG. 10. The NSMF module may include an NS_SO_MMF module and an NS_SO_F module. The second network device in the method 900 may be an NSSMF module in FIG. 10.

As shown in FIG. 10, the method 1000 includes the following steps.

In step S1001, the NS_SO_MMF receives an NSI self-optimization policy from an SvMF module or another policy module. The NSI self-optimization policy may be a self-optimization policy sent by an operator. The NSI self-optimization policy may include at least one of the following: for example, whether NSI self-optimization is allowed, a self-optimization function allowed to operate, a trigger condition of a self-optimization function, a valid range of a self-optimization parameter, whether to obtain confirmation before optimization, or whether to feed back an optimization result.

In step S1002, the NS_SO_MMF sends a configuration message to the NS_SO_F, where the configuration message may include an NSI ID, a trigger condition for automatic NSI capacity optimization, and an NSI capacity adjustment range. An NSI capacity may be measured by parameters such as a quantity of supported users, a quantity of supported connections, and total bandwidth. Capacity occupancy may be measured by an occupation rate. Optionally, when the NS_SO_MMF and the NS_SO_F are set on a same network device, this step may be considered as internal interaction of the network device.

In step S1003, the NS_SO_F is configured and enabled according to a command of the NS_SO_MMF, executes a self-optimization algorithm, and monitors NSI capacity occupancy, including monitoring NSSIs of an NSI.

In step S1004, the NS_SO_F sends request information to the NSSMF to request NSSI capacity occupancy, where it may be specified that the NSSMF reports NSSI capacity occupancy periodically or when an NSSI capacity occupancy reaches a specific threshold, and when the NSI includes a number of NSSIs, the NS_SO_F may request capacity occupancy of the NSSIs from a number of NSSMFs.

In step S1005, the NSSMF reports, according to the request, the NSSI capacity occupancy to the NS_SO_F periodically or when the capacity occupancy reaches the threshold.

In step S1006, the NS_SO_F determines, based on the capacity occupancy of the number of NSSIs, whether current capacity occupancy of the NSI exceeds a threshold, and triggers a self-optimization action if the capacity occupancy of the current NSI exceeds the threshold.

For example, if the NSI currently supports a quantity of X connections and the current capacity occupancy reaches 90%*X, the quantity of connections supported by the NSI may be increased to 150%*X.

In step S1007, before NSSI self-optimization is performed, the NS_SO_MMF and the NSSMF obtain authorization information from the SvMF module or another policy module, where the authorization information may be authorization information sent by an operator. For example, the SvMF module or another policy module may be used to inform the operator that an NSI configuration parameter is to be modified, and request the operator to determine whether the modification is allowed.

In step S1008, execute a self-optimization result to configure the NSI and expand the capacity, including requesting the NSSMF to expand NSSI capacities.

Optionally, capacity expansion actions include: checking all NSSIs of the NSI and the capacities supported by the NSSIs, to determine that the allowed capacities supported by the NSSIs need to be expanded. For example, a capacity supported by an NSSI 1 is X, and a capacity supported by an NSSI 2 is 150% X. When created, NSSIs may provide different support for the NSI based on resources of the NSSIs. In this case, requesting the NSSMF to expand the capacity of the NSSI 1, in other words, sending a capacity expansion request, is required.

S1009, the NSSMF reports to the NS_SO_F on completion of NSSI capacity modification.

In step S1010, the NS_SO_F reports the self-optimization result to the NS_SO_MMF, where the self-optimization result may include the NSI ID, an NSSI ID, and a modified NSSI capacity.

In step S1011, the NS_SO_MMF reports report information to the SvMF module or the another policy module, where the report information is used to indicate a result of modifying a configuration parameter of the first network slice subnet instance or the self-optimization result, and the report information may include information about the NSI ID, or a modified NSI capacity size.

Figure 11:
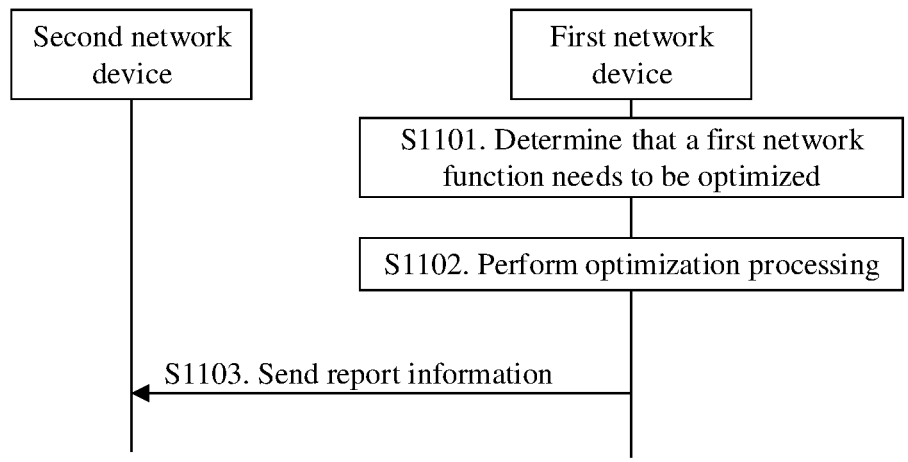
FIG. 11 is a schematic diagram of a network slice instance management method according to another embodiment.

FIG. 11 is a schematic flowchart of a network slice instance management method 1100 according to an embodiment of this application. The method 1100 may be applied to any one of the network management architectures shown in FIG. 1 to FIG. 5. Optionally, in FIG. 11, a first network device may include an NF_SO_MMF module or an NFM module, and the NFM module may include an NF_SO_MMF module and an NF_SO_F module. A second network device may include an NS_SO_MMF module. A third network device may include a network function virtualization orchestrator (NFVO) module, and the NFVO module may be connected to at least one network function and may be configured to manage a network function.

As shown in FIG. 11, the method 1100 includes the following steps.

In step S1101, the first network device determines that a first network function of a first network slice instance needs to be optimized.

In step S1102, the first network device optimizes the first network function, where the optimization includes: modifying a configuration parameter of the first network function, or replicating the first network function and adding the second network function to the first network slice instance, so that the first network slice instance includes the second network function.

Optionally, the first network function and the second network function may jointly provide a service.

Optionally, when a computing capability of the first network function is insufficient, the first network device may automatically generate an identical replica of the first network function: the second network function, and add the second network function to the first network slice instance to provide a service together with the first network function.

The configuration parameter of the first network function may include a location parameter, a topology parameter, and a function parameter of the first network function.

In step S1103, the first network device sends report information to the second network device, where the report information is used to indicate a result of optimizing the first network function by the first network device, and the second network device is configured to manage the first network slice instance.

Optionally, the report information indicates a result of optimizing the configuration parameter of the first network function.

Optionally, the report information may include information such as an identifier of the first network slice instance, an identifier of the first network function, and an identifier of the second network function or result information of replicating the first network function.

In this embodiment, the first network device may manage the first network function. The second network device manages the first network function by using the first network device. The first network slice instance includes the first network function. In this way, network slice instances can be flexibly managed, thereby improving efficiency of network slice instance management.

Optionally, the method 1100 further includes: receiving, by the first network device, a self-optimization policy from the second network device, where the self-optimization policy is used to indicate a rule of modifying a network function; and the optimizing, by the first network device, the first network function includes: optimizing, by the first network device, the first network function based on the self-optimization policy.

For example, the self-optimization policy may include an NSI identifier for indicating an NSI to which the self-optimization policy belongs, a network function identifier, a command for enabling an automatic network function replication function, and a parameter and a threshold for triggering automatic network function replication. For example, if a quantity of users or services served by a network function reaches a specific threshold, automatic network function replication is performed.

Optionally, the method 1100 further includes: obtaining, by the first network device, authorization information from the second network device, where the authorization information is used to indicate permission for optimizing the first network function.

For example, the authorization information may be operator authorization information. Before optimizing a network function, the first network device may obtain operator authorization via the second network device. For example, the first network device informs the operator that the network function is to be optimized, to determine whether the optimization is allowed.

Optionally, in the method 1100, the configuration parameter of the first network function includes the location parameter of the first network function.

For example, in a process in which an NSI provides a service, a network function location may be modified based on traffic, a resource status, and a user feature of a network. For example, a user plane function (UPF) is migrated to a location closer to a user or a location at which network resources are sufficient. An automatic network function location modification function is applicable to a scenario in which a network behavior can be predicted to an extent. Location adjustment may be relatively quickly implemented by setting a threshold and providing several available locations.

Optionally, the method 1100 further includes: sending, by the first network device, reservation request information to the third network device, where the reservation request information is used to instruct the third network device to reserve a network resource for the first network function, and the third network device is configured to allocate a network resource to a network function.

Optionally, the network resource may be a computing resource, a storage resource, or another type of resource allocated to the network function.

In this embodiment of this application, a network function network resource mainly is a virtual resource occupied by a network function. Therefore, there is some interaction between the first network device and a device managing network resource allocation of a network function (namely, a third network device). When resources for a network function are insufficient, for example, when a parameter for monitoring a processing speed or other performance of the network function reaches a threshold, resources are automatically increased for the network function within a specific range.

For example, the first network device may instruct the third network device to reserve some resources for the network function, and automatically adjust the network resources corresponding to the network function within a specific range. This can quickly improve performance of the network function and better serve an NSI service.

Figure 12:
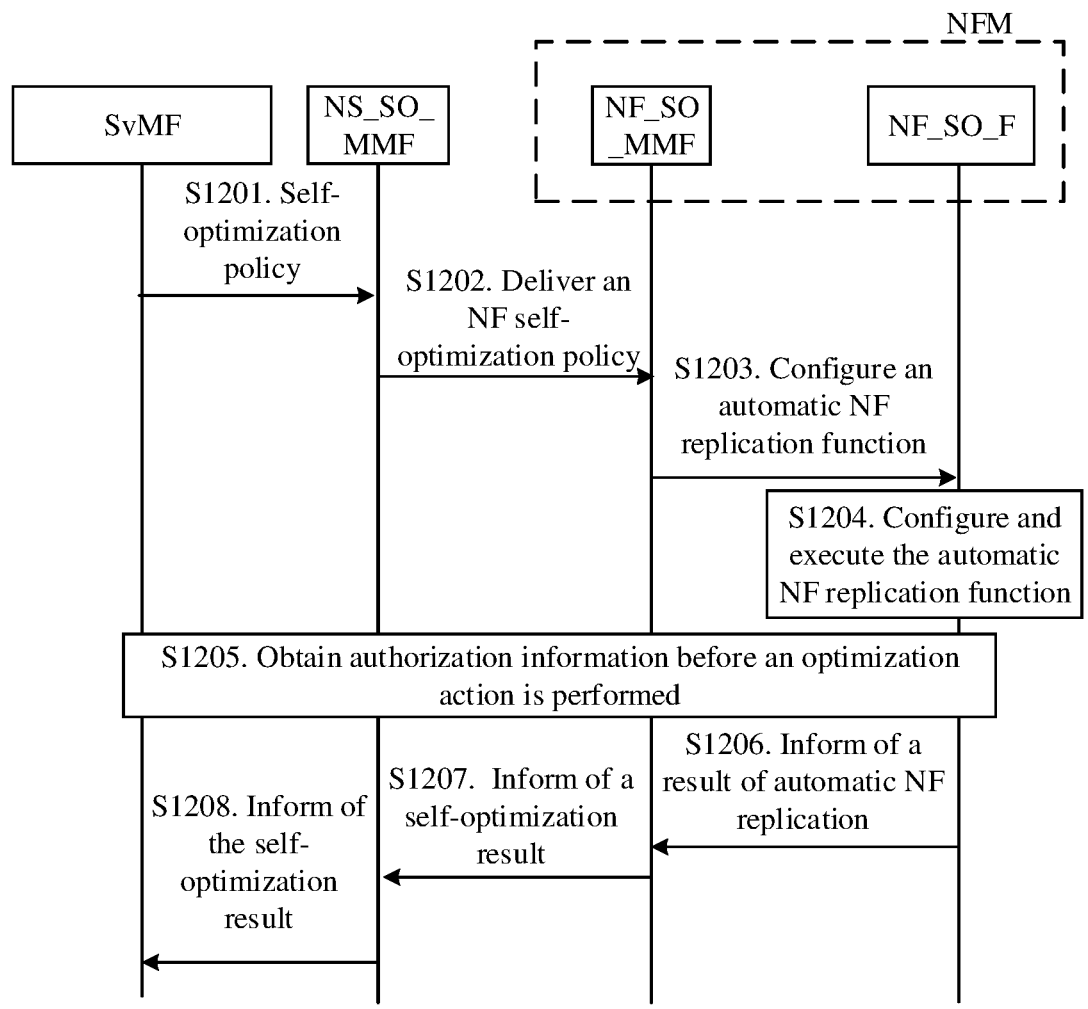
FIG. 12 is a schematic diagram of a network slice instance management method according to another embodiment.

For example, FIG. 12 is a schematic flowchart of a network slice instance management method 1200 according to an embodiment of this application. The example in FIG. 12 provides a process of replicating a network function by an NF_SO_MMF module. In FIG. 12, the first network device in the method 1100 may be an NS_SO_MMF module or an NSMF module. The NSMF module may include an NS_SO_MMF module. The second network device may be an NF_SO_MMF module or an NFM module. The NFM module may include an NF_SO_MMF module and an NF_SO_F module.

As shown in FIG. 12, the method 1200 includes the following steps.

In step S1201, the NS_SO_MMF receives an NSI self-optimization policy from an operator, where the NSI self-optimization policy may be a self-optimization policy sent by the operator. The NSI self-optimization policy may include at least one of the following: for example, whether NSI self-optimization is allowed, a self-optimization function allowed to operate, whether to obtain confirmation before optimization, or whether to feed back an optimization result.

In step S1202, the NS_SO_MMF sends an network function self-optimization policy to the NF_SO_MMF, where the self-optimization policy may include an NSI identifier for indicating an NSI to which the self-optimization policy belongs, an NF identifier, a command for enabling an automatic NF replication function, and a parameter and a threshold for triggering automatic NF replication. For example, if a quantity of users or services served by an NF reaches a specific threshold, automatic NF replication is performed.

In step S1203, the NF_SO_MMF configures, for the NF_SO_F, the network function identifier and the parameter and the threshold for triggering automatic replication.

In step S1204, the NF_SO_F configures and executes the automatic network function replication function, and performs an automatic replication action when detecting that the parameter reaches the threshold.

In step S1205, before network function self-optimization is performed, the NS_SO_MMF and the NF_SO_MMF obtain authorization information from an SvMF module or another policy module, where the authorization information may be authorization information sent by the operator. For example, the SvMF module or another policy module may be used to inform the operator that an NSI configuration parameter is to be modified, and request the operator to determine whether the modification is allowed.

In step S1206, the NF_SO_F informs the NF_SO_MMF of a result of automatic network function replication.

In step S1207, the NF_SO_MMF informs the NS_SO_MMF of the result of automatic network function replication, where the result of automatic network function replication may include the NSI identifier, the network function identifier, and an network function replication result.

In step S1208, the NS_SO_MMF reports report information to the SvMF module or another policy module, where the report information is used to indicate a result of modifying a network function configuration parameter or a self-optimization result. The report information may include the NSI identifier, the network function identifier, and the network function replication result.

In this embodiment of this application, when computing and processing capabilities of a network function are limited, the network function is automatically replicated to produce a same network function, to jointly serve an NSI. By setting a trigger parameter or an allowed replication action, the network function can be quickly replicated to provide a service. This improves performance of the entire NSI, thereby improving efficiency of network slice instance management.

Figure 13:
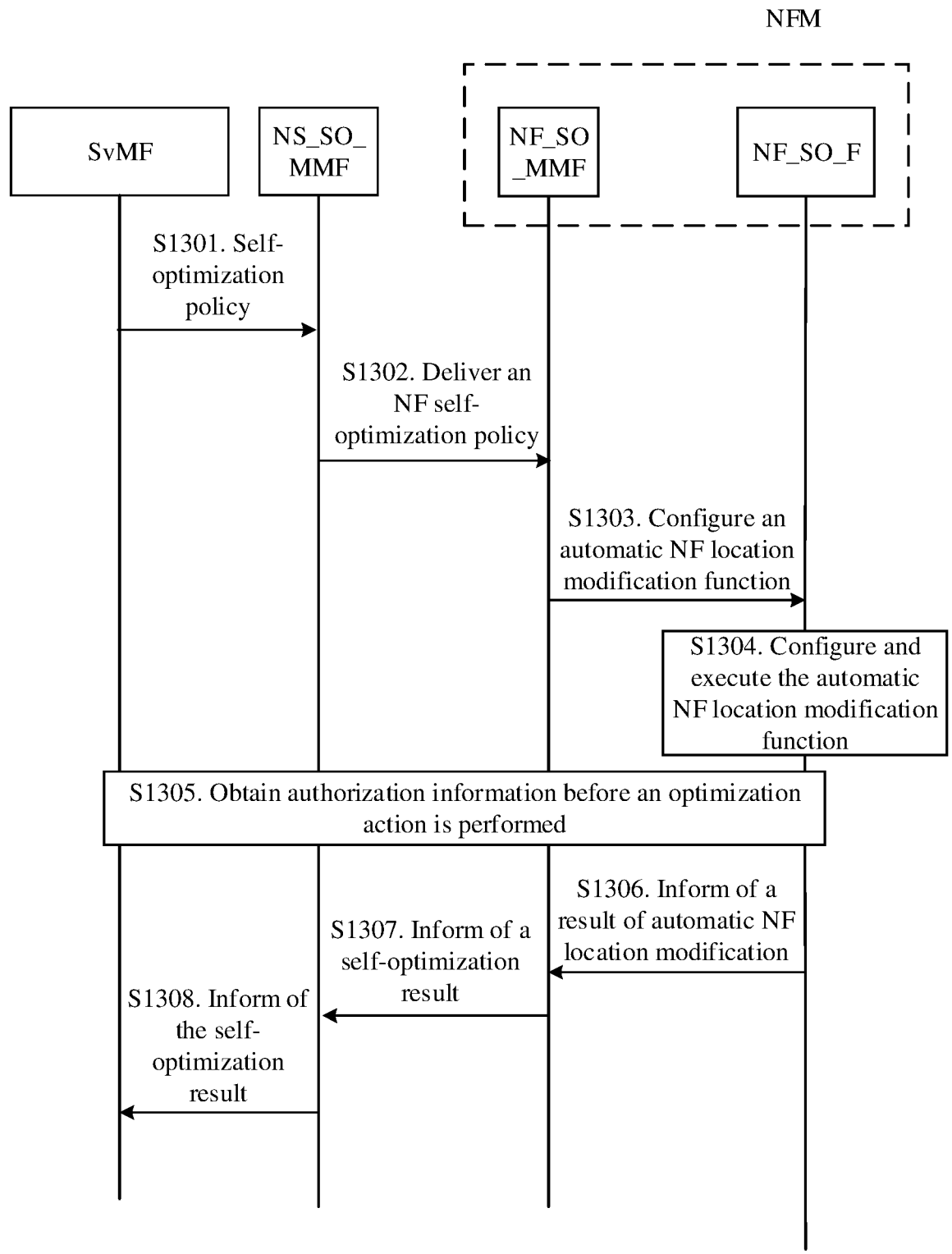
FIG. 13 is a schematic diagram of a network slice instance management method according to another embodiment.

In an example, FIG. 13 is a schematic flowchart of a network slice instance management method 1300 according to an embodiment of this application. The example in FIG. 13 provides a process of optimizing a location parameter of a network function by an NF_SO_MMF module. In FIG. 13, the first network device in the method 1100 may be an NS_SO_MMF module or an NSMF module. The NSMF module may include an NS_SO_MMF module. The second network device may be an NF_SO_MMF module or an NFM module. The NFM module may include an NF_SO_MMF module and an NF_SO_F module.

As shown in FIG. 13, the method 1300 includes the following steps.

In step S1301, the NS_SO_MMF receives an NSI self-optimization policy from an operator, where the NSI self-optimization policy may be a self-optimization policy sent by the operator. The NSI self-optimization policy may include at least one of the following: for example, whether NSI self-optimization is allowed, a self-optimization function allowed to operate, whether to obtain confirmation before optimization, or whether to feed back an optimization result.

In step S1302, the NS_SO_MMF sends an NF self-optimization policy to the NF_SO_MMF, where the self-optimization policy may include an NSI identifier for indicating an NSI to which the self-optimization policy belongs, a network function identifier, a parameter and a threshold for triggering automatic location modification, and a list of available locations. For example, a location identification method is to use an IP address of a virtual resource, and location migration is implemented by migrating an NF to a corresponding virtual resource.

In step S1303, the NF_SO_MMF configures, for the NF_SO_F, the network function identifier, the parameter and the threshold for triggering automatic location modification, and a list of available network function locations.

In step S1304, the NF_SO_F configures and executes an automatic network function location modification function, and modifies a network function location when detecting that the parameter reaches the threshold.

In step S1305, before network function self-optimization is performed, the NS_SO_MMF and the NF_SO_MMF obtain authorization information from an SvMF module or another policy module, where the authorization information may be authorization information sent by the operator. For example, the SvMF module or another policy module may be used to inform the operator that an NSI configuration parameter is to be modified, and request the operator to determine whether the modification is allowed.

In step S1306, the NF_SO_F informs the NF_SO_MMF of a result of automatic network function location modification.

In step S1307, the NF_SO_MMF informs the NS_SO_MMF of the result of automatic network function location modification, where the result of automatic network function location modification may include the NSI identifier, the network function identifier, and a network function location.

In step S1308, the NS_SO_MMF reports report information to the SvMF module or the another policy module, where the report information is used to indicate a result of modifying a network function configuration parameter or a self-optimization result, and the report information may include the NSI identifier, the network function identifier, and the network function replication result.

In this embodiment, when a change occurs on a user feature or network traffic, a location of a network function may be changed to adapt to the change, thereby improving performance of an entire NSI. Automatic location modification can quickly migrate the network function to one of several available locations, so that efficiency of network slice instance management can be improved.

Figure 14:
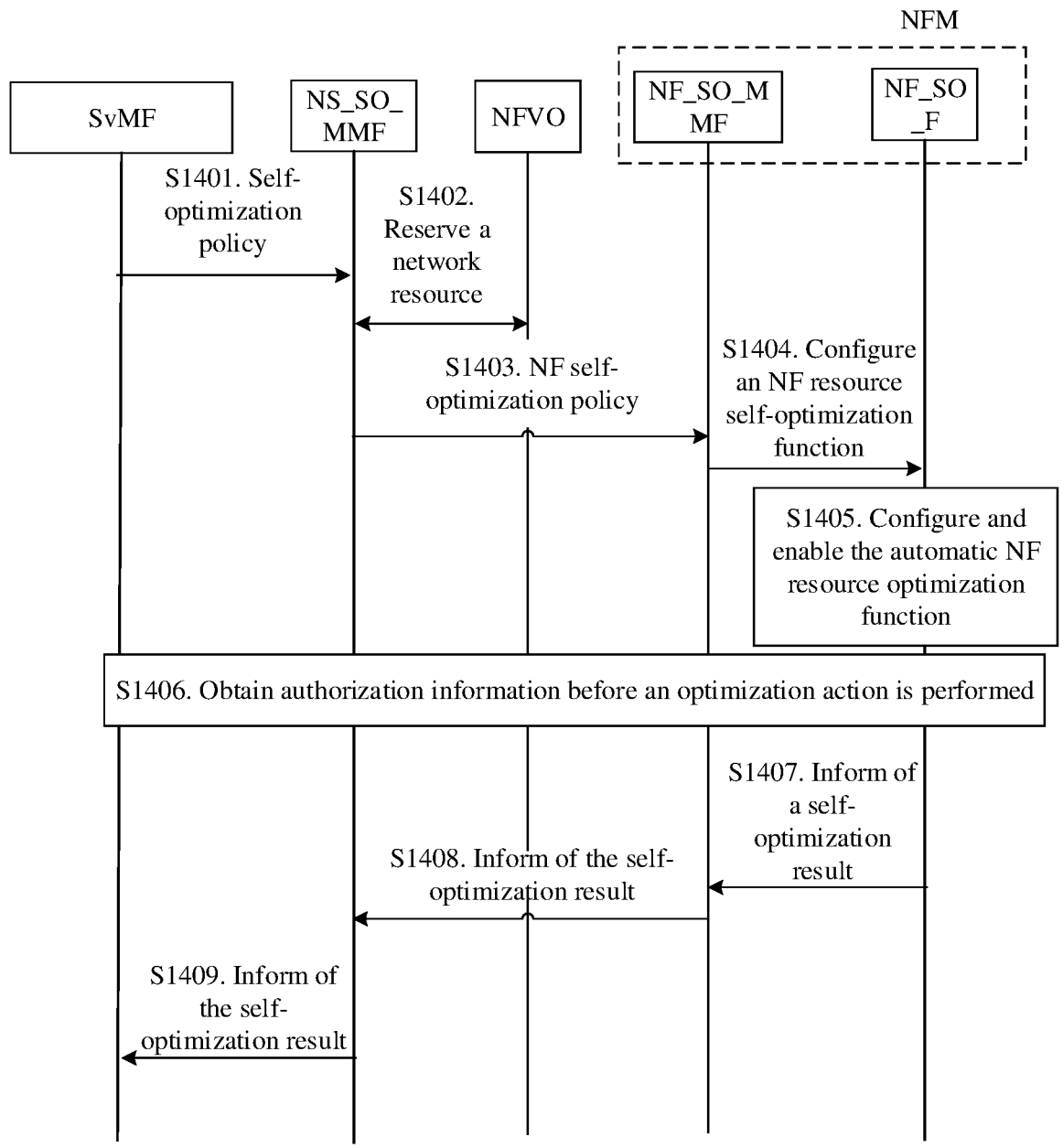
FIG. 14 is a schematic diagram of a network slice instance management method according to another embodiment.

In an example, FIG. 14 is a schematic flowchart of a network slice instance management method 1400 according to an embodiment. The example in FIG. 14 provides a process of reserving a network resource for a network function by an NF_SO_MMF. In FIG. 14, the first network device in the method 1100 may be an NS_SO_MMF module or an NSMF module. The NSMF module may include an NS_SO_MMF module. The second network device may be an NF_SO_MMF module or an NFM module. The NFM module may include an NF_SO_MMF module and an NF_SO_F module.

As shown in FIG. 14, the method 1400 includes the following steps.

In step S1401, the NS_SO_MMF receives an NSI self-optimization policy from an operator, where the NSI self-optimization policy may be a self-optimization policy sent by the operator. The NSI self-optimization policy may include at least one of the following: for example, whether NSI self-optimization is allowed, a self-optimization function allowed to operate, whether to obtain confirmation before optimization, or whether to feed back an optimization result.

In step S1402, the NS_SO_MMF sends resource reservation request information to an NFVO to request the NFVO to reserve a network resource for a network function. The network resource includes a computing resource or a storage resource, and a reserved resource is used for resource expansion of the network function.

In step S1403, the NS_SO_MMF delivers a network function self-optimization policy to the NF_SO_MMF, where the network function self-optimization policy may include an NSI identifier for indicating an NSI to which the optimization policy belongs to, a network function identifier, a parameter and a threshold for triggering network resource modification, a network resource adjustment range, and an identifier of an available network resource, for example, a virtual machine identifier and a storage identifier.

In step S1404, the NF_SO_MMF configures, for the NF_SO_F, a network function resource self-optimization function, the NF identifier, the parameter and the threshold for triggering resource modification, a resource self-optimization range, the identifier of the available resource, and the like.

In step S1405, the NF_SO_F configures and enables the network function resource self-optimization function.

In step S1406, before NF self-optimization is performed, the NS_SO_MMF and the NF_SO_MMF obtain authorization information from an SvMF module or another policy module, where the authorization information may be authorization information sent by the operator. For example, the SvMF module or another policy module may be used to inform the operator that an NSI configuration parameter is to be modified, and request the operator to determine whether the modification is allowed.

In step S1407, the NF_SO_F informs the NF_SO_MMF of a result of automatic network function resource optimization.

In step S1408, the NF_SO_MMF informs the NS_SO_MMF of the result of automatic network function resource optimization, where the result of automatic network function resource optimization may include the NSI identifier, the network function identifier, and a network function resource.

In step S1409, the NS_SO_MMF informs the operator of the result of automatic network function resource optimization, where the result of automatic network function resource optimization may include the NSI identifier, the network function identifier, and the network function resource.

In this embodiment, under the premise that some resources are reserved, resources corresponding to the network function may be automatically adjusted within a specific range. This can quickly improve performance of the network function and better serve an NSI service, so that efficiency of network slice instance management is improved.

Figure 15:
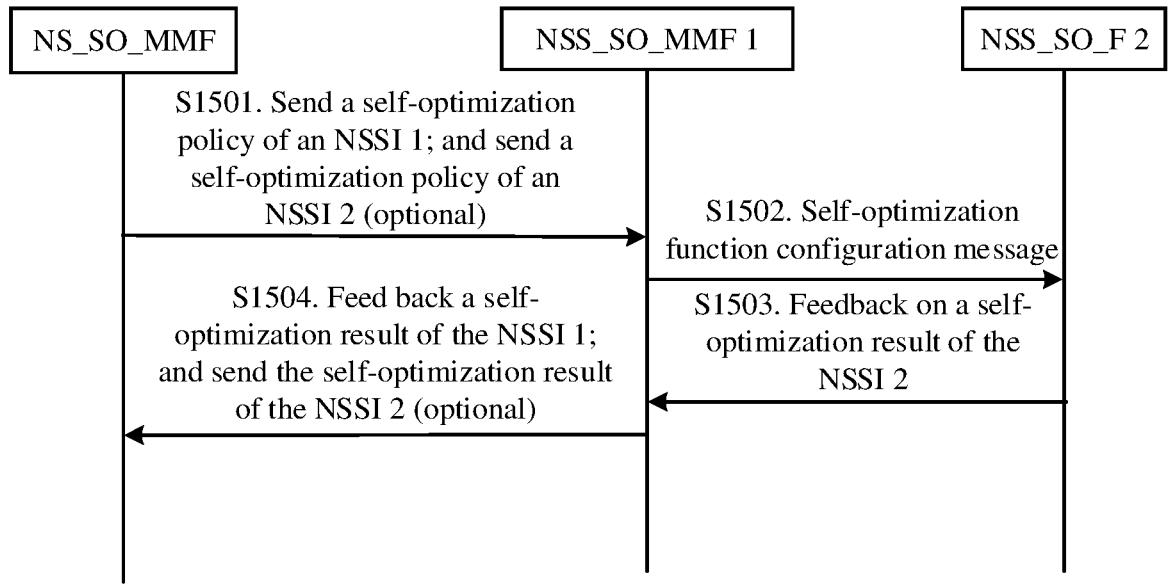
FIG. 15 is a schematic diagram of a network slice instance management method according to another embodiment.

In an example, FIG. 15 shows a network slice instance management method 1500. The example in FIG. 15 may be applied to the network management architecture 300 in FIG. 3. In a case of NSSI nesting, that is, when an NSSI 1 includes an NSSI 2, an NS_SO_MMF may also send a self-optimization policy of the NSSI 2 when sending a self-optimization policy related to the NSSI 1 to an NSS_SO_MMF 1. Alternatively, the self-optimization policy of the NSSI 2 may also be generated by the NSS_SO_MMF 1. The NSS_SO_MMF 1 configures an NSS_SO_F 2. For details about configuration content, refer to the corresponding content in FIG. 6 to FIG. 14. Details are not described herein again.

As shown in FIG. 15, the method 1500 includes the following steps:

In step S1501, the NS_SO_MMF sends the self-optimization policy of the NSSI 1 to the NSS_SO_MMF 1, and optionally, the NS_SO_MMF may also send the self-optimization policy of the NSSI 2 to the NSS_SO_MMF 1.

In step S1502, the NSS_SO_MMF 1 sends automatic function configuration information to the NSS_SO_F 2.

In step S1503, the NSS_SO_F 2 sends a feedback on a self-optimization result of the NSSI 2 to the NSS_SO_MMF 1.

In step S1504, the NSS_SO_MMF 1 sends a self-optimization result of the NSSI 1 to the NS_SO_MMF, and optionally, the NSS_SO_MMF 1 may also send the self-optimization result of the NSSI 2 to the NS_SO_MMF.

Figure 16:
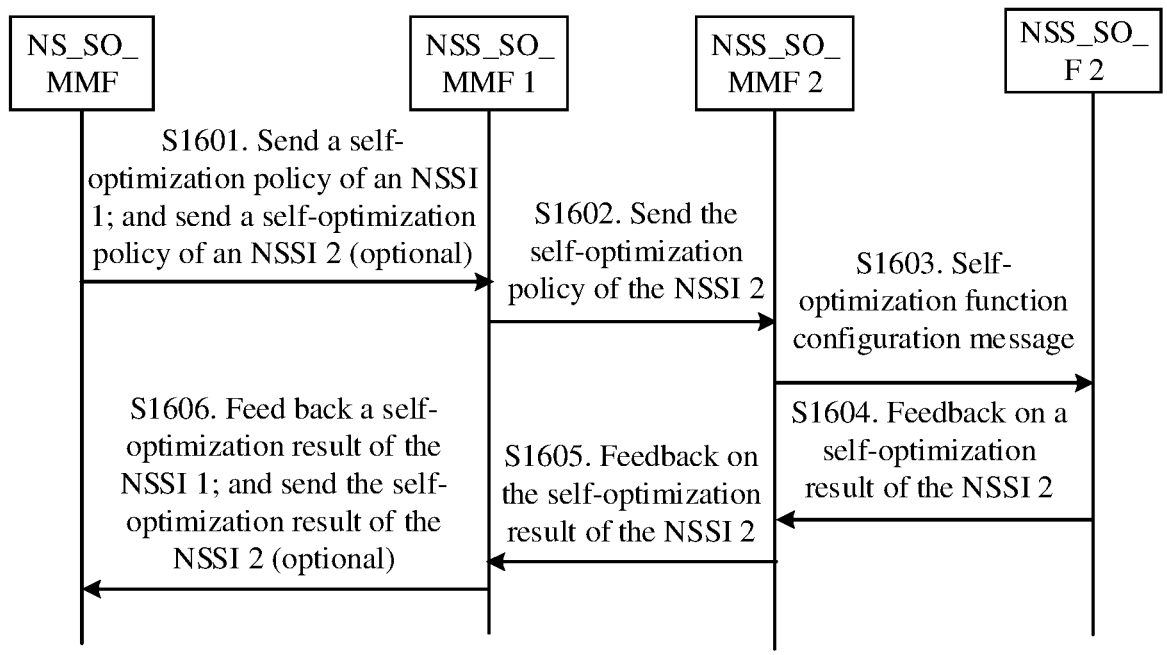
FIG. 16 is a schematic diagram of a network slice instance management method according to another embodiment.

In an example, FIG. 16 shows a network slice instance management method 1600. The example in FIG. 16 may be applied to the network management architecture 400 in FIG. 4. In a case of NSSI nesting, that is, when an NSSI 1 includes an NSSI 2, an NS_SO_MMF may also send a self-optimization policy of the NSSI 2 when sending a self-optimization policy related to the NSSI 1 to an NSS_SO_MMF 1. Alternatively, the self-optimization policy of the NSSI 2 may also be generated by the NSS_SO_MMF 1. The NSS_SO_MMF 1 sends the self-optimization policy of the NSSI 2 to an NSS_SO_MMF 2. Interaction between the NSS_SO_MMF 1 and the NSS_SO_MMF 2 includes sending the self-optimization policy of the NSSI 2, obtaining a running status of a self-optimization function of the NSSI 2, and obtaining a self-optimization result of the NSSI 2. For details about configuration content, refer to the corresponding content in FIG. 6 to FIG. 14. Details are not described herein again.

As shown in FIG. 16, the method 1600 includes the following steps:

In step S1601, the NS_SO_MMF sends the self-optimization policy of the NSS 1 to the NSS_SO_MMF 1, and optionally, the NS_SO_MMF may also send the self-optimization policy of the NSSI 2 to the NSS_SO_MMF 1.

In step S1602, the NSS_SO_MMF 1 sends the self-optimization policy of the NSSI 2 to the NSS_SO_MMF 2.

In step S1603, the NSS_SO_MMF 2 sends automatic function configuration information to an NSS_SO_F 2.

In step S1604, the NSS_SO_F 2 sends a feedback on the self-optimization result of the NSSI 2 to the NSS_SO_MMF 2.

In step S1605, the NSS_SO_MMF 2 sends the feedback on the self-optimization result of the NSSI 2 to the NSS_SO_MMF 1.

In step S1606, the NSS_SO_MMF 1 sends a self-optimization result of the NSSI 1 to the NS_SO_MMF, and optionally, the NSS_SO_MMF 1 may also send the self-optimization result of the NSSI 2 to the NS_SO_MMF.

Figure 17:
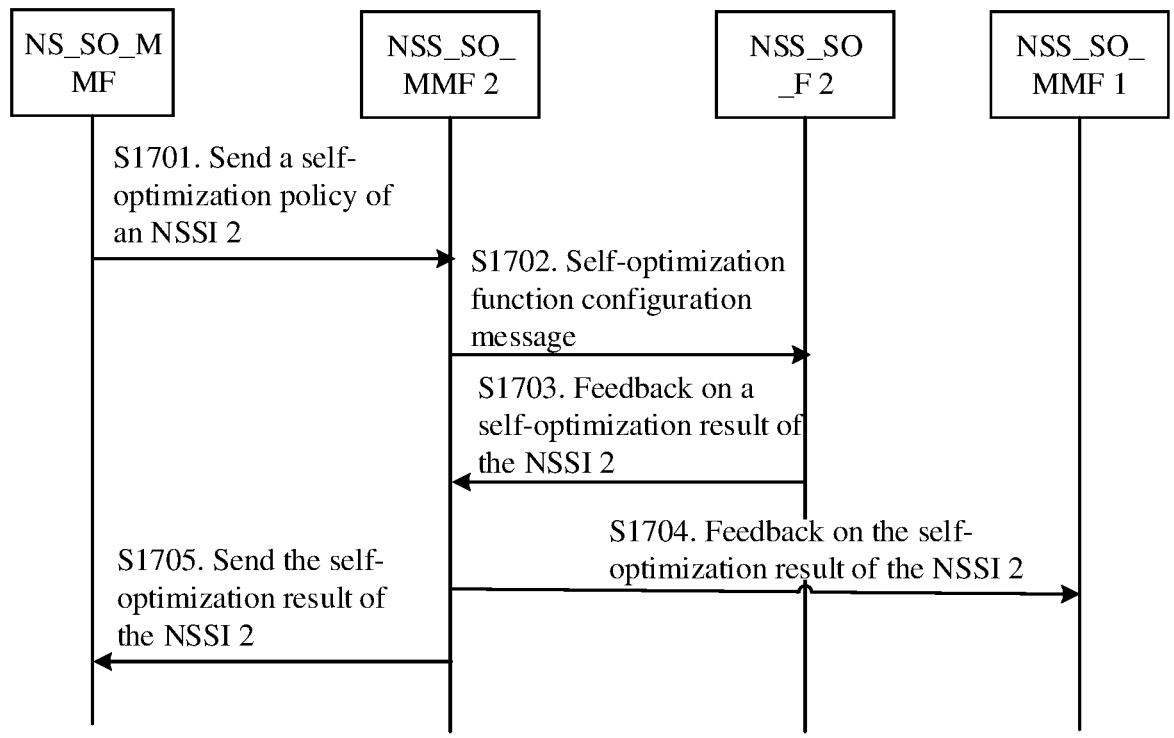
FIG. 17 is a schematic diagram of a network slice instance management method according to another embodiment of this application.

In another example, FIG. 17 shows a network slice instance management method 1700. The example in FIG. 17 may be applied to the network management architecture 500 in FIG. 5. In a case of NSSI nesting, that is, when an NSSI 1 includes an NSSI 2, an NS_SO_MMF directly sends a self-optimization policy related to the NSSI 2 to an NSS_SO_MMF 2. The NSS_SO_MMF 2 configures an NSS_SO_F 2. For details about configuration content, refer to the corresponding content in FIG. 6 to FIG. 14. Details are not described herein again.

As shown in FIG. 17, the method 1700 includes the following steps:

In step S1701, the NS_SO_MMF sends the self-optimization policy of the NSSI 2 to the NSS_SO_MMF 2.

In step S1702, the NSS_SO_MMF 2 sends automatic function configuration information to the NSS_SO_F 2.

In step S1703, the NSS_SO_F 2 sends a feedback on a self-optimization result of the NSSI 2 to the NSS_SO_MMF 2.

In step S1704, the NSS_SO_MMF 2 sends the feedback on the self-optimization result of the NSSI 2 to an NSS_SO_MMF 1.

In step S1706, the NSS_SO_MMF 2 sends the self-optimization result of the NSSI 2 to the NS_SO_MMF.

The foregoing describes in detail the network slice management method and the network management architecture according to the embodiments of the present invention with reference to FIG. 1 to FIG. 17. The following describes in detail the network device according to the embodiments of the present invention with reference to FIG. 18 to FIG. 29.

Figure 18:
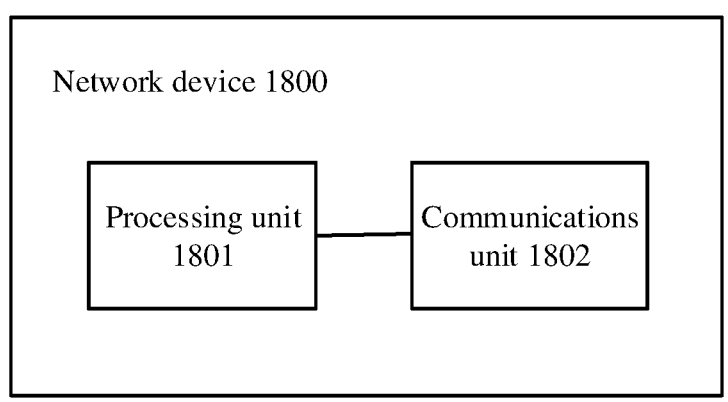
FIG. 18 is a schematic diagram of a network device according to an embodiment.

FIG. 18 is a schematic block diagram of a network device 1800 according to another embodiment. It should be understood that the network device 1800 can perform the steps performed by the first network device in the methods in FIG. 6 to FIG. 8. To avoid repetition, details are not described herein again. The network device 1800 includes a processing unit 1801 and a communications unit 1802.

The processing unit 1801 is configured to determine that a configuration parameter of a first network slice subnet instance needs to be modified, where the first network device is configured to manage the first network slice subnet instance; modify the configuration parameter of the first network slice subnet instance; and send report information to a second network device via the communications unit 1802, where the report information is used to indicate a result of modifying the configuration parameter of the first network slice subnet instance, the second network device is configured to manage a first network slice instance, and the first network slice instance includes the first network slice subnet instance.

Figure 19:
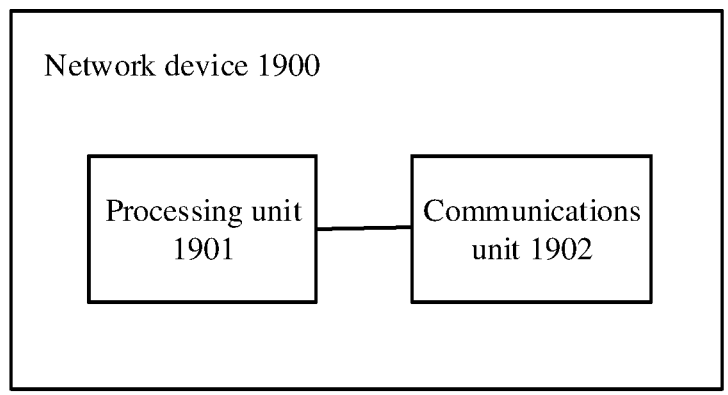
FIG. 19 is a schematic diagram of a network device according to another embodiment.

FIG. 19 is a schematic block diagram of a network device 1900 according to an embodiment. It should be understood that the network device 1900 can perform the steps performed by the second network device in the methods in FIG. 6 to FIG. 8. To avoid repetition, details are not described herein again. The network device 1900 includes a processing unit 1901 and a communications unit 1902.

The processing unit 1901 is configured to receive report information from a first network device via the communications unit 1902, where the report information is used to indicate a result of modifying a configuration parameter of the first network slice subnet instance, the first network device is configured to manage the first network slice subnet instance, the second network device is configured to manage a first network slice instance, and the first network slice instance includes the first network slice subnet instance.

Figure 20:
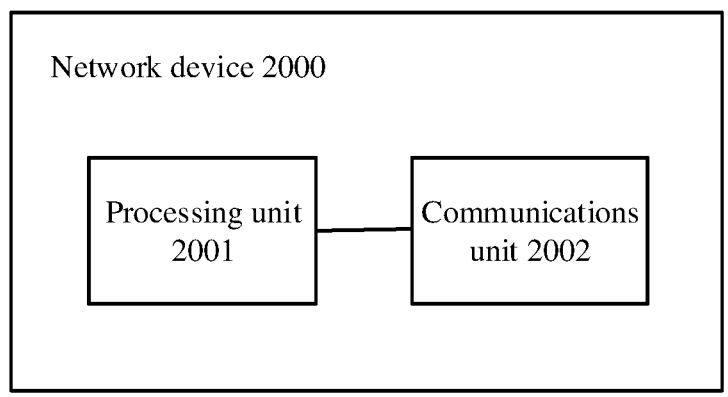
FIG. 20 is a schematic diagram of a network device according to another embodiment.

FIG. 20 is a schematic block diagram of a network device 2000 according to an embodiment. It should be understood that the network device 2000 can perform the steps performed by the first network device in the method in FIG. 9 or FIG. 10. To avoid repetition, details are not described herein again. The network device 2000 includes a processing unit 2001 and a communications unit 2002.

The processing unit 2001 is configured to determine to modify a configuration parameter of a first network slice instance, where the first network slice instance includes at least one network slice subnet instance; send first indication information to at least one second network device via the communications unit 2002, where the first indication information is used to instruct the at least one second network device to modify a configuration parameter of the at least one network slice subnet instance; and receive first reply information from the at least one second network device via the communications unit 2002, where the first reply information is used to indicate a result of modifying the configuration parameter of the at least one network slice subnet instance.

Figure 21:
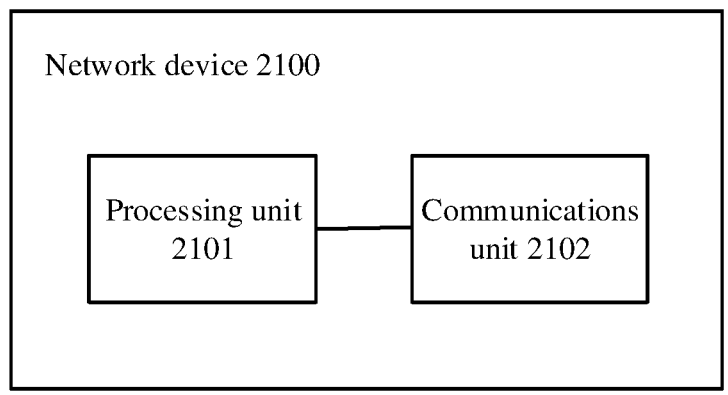
FIG. 21 is a schematic diagram of a network device according to another embodiment.

FIG. 21 is a schematic block diagram of a network device 2100 according to another embodiment. It should be understood that the network device 2100 can perform the steps performed by the second network device in the method in FIG. 9 or FIG. 10. To avoid repetition, details are not described herein again. The network device 2100 includes a processing unit 2101 and a communications unit 2102.

The processing unit 2101 is configured to receive, via the communications unit 2102, first indication information sent by a first network device, where the first indication information is used to instruct the second network device to modify a first network slice subnet instance, the first network device is configured to manage a first network slice instance, and the first network slice instance includes the first network slice subnet instance; and send first reply information to the first network device via the communications unit 2102, where the first reply information is used to indicate a result of modifying a configuration parameter of the first network slice subnet instance.

Figure 22:
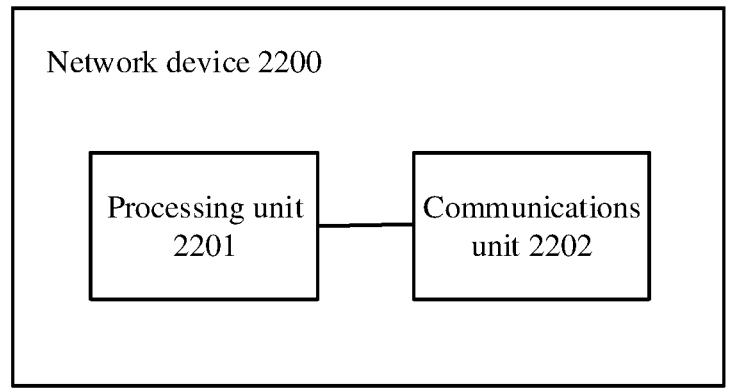
FIG. 22 is a schematic diagram of a network device according to another embodiment.

FIG. 22 is a schematic block diagram of a network device 2200 according to an embodiment. It should be understood that the network device 2200 can perform the steps performed by the first network device in the methods in FIG. 11 to FIG. 14. To avoid repetition, details are not described herein again. The network device 2200 includes a processing unit 2201 and a communications unit 2202.

The processing unit 2201 is configured to determine that a first network function of a first network slice instance needs to be optimized; optimize the first network function, where the optimization includes: modifying a configuration parameter of the first network function, or replicating the first network function and adding the second network function to the first network slice instance, so that the first network slice instance includes the second network function; and send report information to a second network device via the communications unit 2202, where the report information is used to indicate a result of optimizing the first network function by the first network device, and the second network device is configured to manage the first network slice instance.

Figure 23:
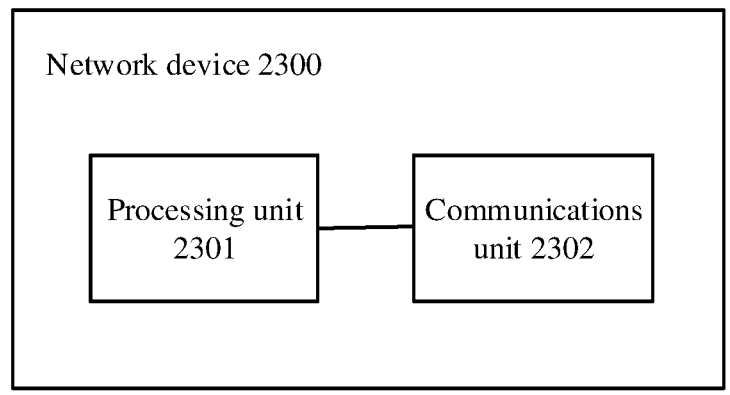
FIG. 23 is a schematic diagram of a network device according to another embodiment.

FIG. 23 is a schematic block diagram of a network device 2300 according to an embodiment. It should be understood that the network device 2300 can perform the steps performed by the second network device in the methods in FIG. 11 to FIG. 14. To avoid repetition, details are not described herein again. The network device 2300 includes a processing unit 2301 and a communications unit 2302.

The processing unit 2301 is configured to receive report information from a first network device via the communications unit 2302, where the report information is used to indicate a result of modifying a configuration parameter of the first network slice subnet instance, the first network device is configured to manage the first network slice subnet instance, the second network device is configured to manage a first network slice instance, and the first network slice instance includes the first network slice subnet instance.

Figure 24:
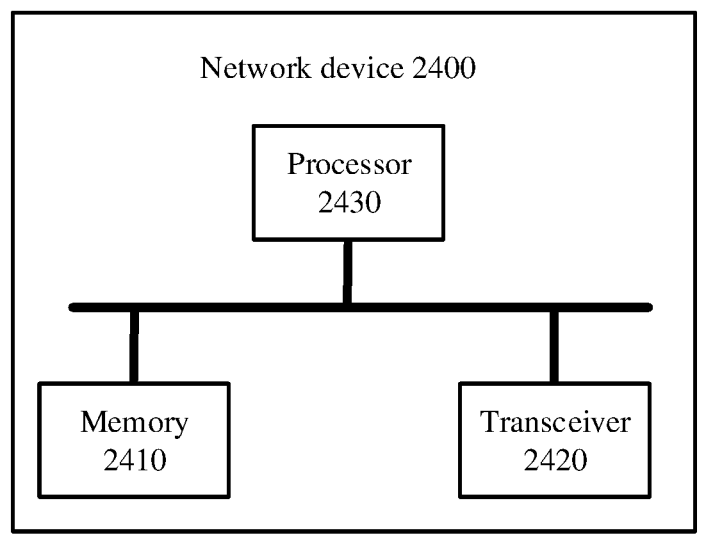
FIG. 24 is a schematic diagram of a network device according to another embodiment.

FIG. 24 is a schematic block diagram of a network device 2400 according to an embodiment. It should be understood that the network device 2400 can perform the steps performed by the first network device in the methods in FIG. 6 to FIG. 8. To avoid repetition, details are not described herein again. The network device 2400 includes:

a memory 2410, configured to store a program;

a transceiver 2420, configured to communicate with another device; and a processor 2430, configured to execute the program in the memory 2410, where when the program is executed, the processor 2430 is configured to determine that a configuration parameter of a first network slice subnet instance needs to be modified, where the first network device is configured to manage the first network slice subnet instance; modify the configuration parameter of the first network slice subnet instance; and send report information to a second network device via the transceiver 2420, where the report information is used to indicate a result of modifying the configuration parameter of the first network slice subnet instance, the second network device is configured to manage a first network slice instance, and the first network slice instance includes the first network slice subnet instance.

Figure 25:
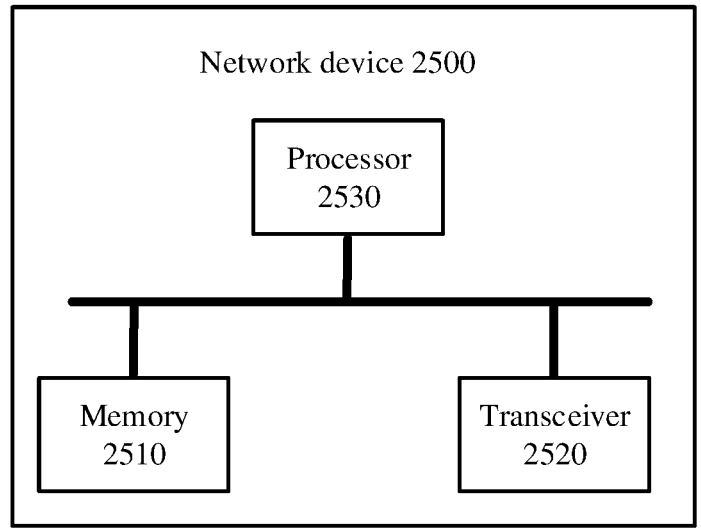
FIG. 25 is a schematic diagram of a network device according to another embodiment.

FIG. 25 is a schematic block diagram of a network device 2500 according to an embodiment. It should be understood that the network device 2500 can perform the steps performed by the second network device in the methods in FIG. 6 to FIG. 8. To avoid repetition, details are not described herein again. The network device 2500 includes:

a memory 2510, configured to store a program;

a transceiver 2520, configured to communicate with another device; and a processor 2530, configured to execute the program in the memory 2510, where when the program is executed, the processor 2530 is configured to receive report information from a first network device via the transceiver 2520, where the report information is used to indicate a result of modifying a configuration parameter of the first network slice subnet instance, the first network device is configured to manage the first network slice subnet instance, the second network device is configured to manage a first network slice instance, and the first network slice instance includes the first network slice subnet instance.

Figure 26:
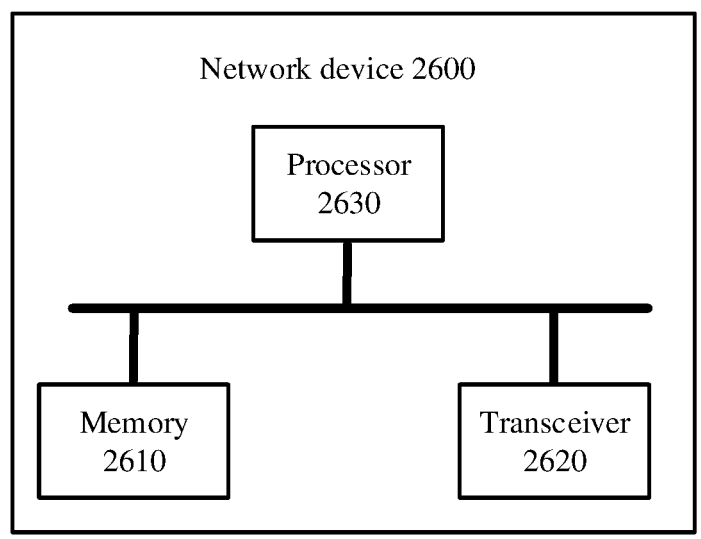
FIG. 26 is a schematic diagram of a network device according to another embodiment.

FIG. 26 is a schematic block diagram of a network device 2600 according to another embodiment. It should be understood that the network device 2600 can perform the steps performed by the first network device in the method in FIG. 9 or FIG. 10. To avoid repetition, details are not described herein again. The network device 2600 includes:

a memory 2610, configured to store a program;

a transceiver 2620, configured to communicate with another device; and a processor 2630, configured to execute the program in the memory 2610, where when the program is executed, the processor 2630 is configured to determine to modify a configuration parameter of a first network slice instance, where the first network slice instance includes at least one network slice subnet instance; send first indication information to at least one second network device via the transceiver 2620, where the first indication information is used to instruct the at least one second network device to modify a configuration parameter of the at least one network slice subnet instance; and receive first reply information from the at least one second network device via the transceiver 2620, where the first reply information is used to indicate a result of modifying the configuration parameter of the at least one network slice subnet instance.

Figure 27:
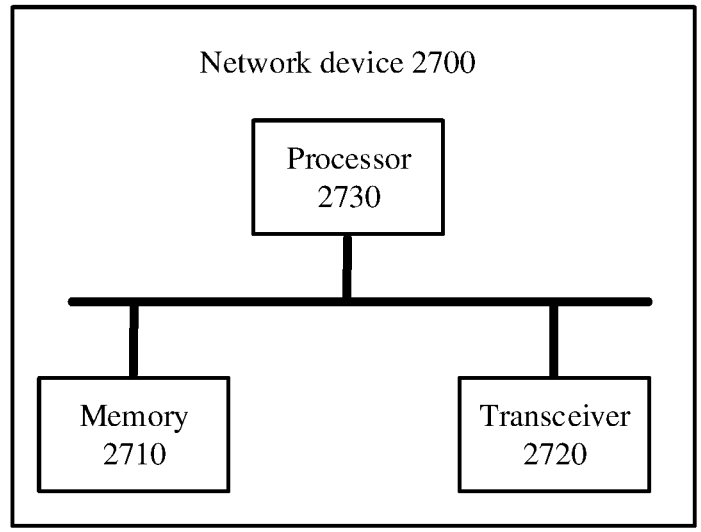
FIG. 27 is a schematic diagram of a network device according to another embodiment.

FIG. 27 is a schematic block diagram of a network device 2700 according to an embodiment. It should be understood that the network device 2700 can perform the steps performed by the second network device in the method in FIG. 9 or FIG. 10. To avoid repetition, details are not described herein again. The network device 2700 includes:

a memory 2710, configured to store a program;

a transceiver 2720, configured to communicate with another device; and a processor 2730, configured to execute the program in the memory 2710, where when the program is executed, the processor 2730 is configured to receive, via the transceiver 2720, first indication information sent by a first network device, where the first indication information is used to instruct the second network device to modify a first network slice subnet instance, the first network device is configured to manage a first network slice instance, and the first network slice instance includes the first network slice subnet instance; and send first reply information to the first network device via the transceiver 2720, where the first reply information is used to indicate a result of modifying a configuration parameter of the first network slice subnet instance.

Figure 28:
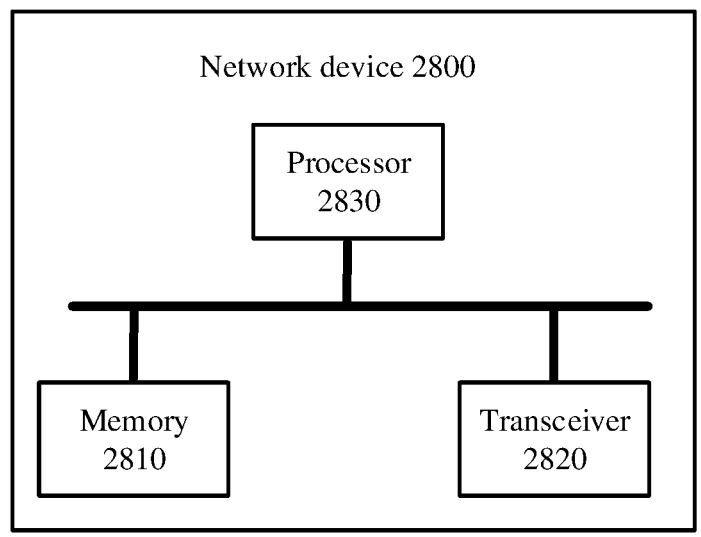
FIG. 28 is a schematic diagram of a network device according to another embodiment.

FIG. 28 is a schematic block diagram of a network device 2800 according to another embodiment. It should be understood that the network device 2800 can perform the steps performed by the first network device in the methods in FIG. 11 to FIG. 14. To avoid repetition, details are not described herein again. The network device 2800 includes:

a memory 2810, configured to store a program;

a transceiver 2820, configured to communicate with another device; and a processor 2830, configured to execute the program in the memory 2810, where when the program is executed, the processor 2830 is configured to determine that a first network function of a first network slice instance needs to be optimized; optimize the first network function, where the optimization includes: modifying a configuration parameter of the first network function, or replicating the first network function and adding the second network function to the first network slice instance, so that the first network slice instance includes the second network function; and send report information to a second network device via the transceiver 2820, where the report information is used to indicate a result of optimizing the first network function by the first network device, and the second network device is configured to manage the first network slice instance.

Figure 29:
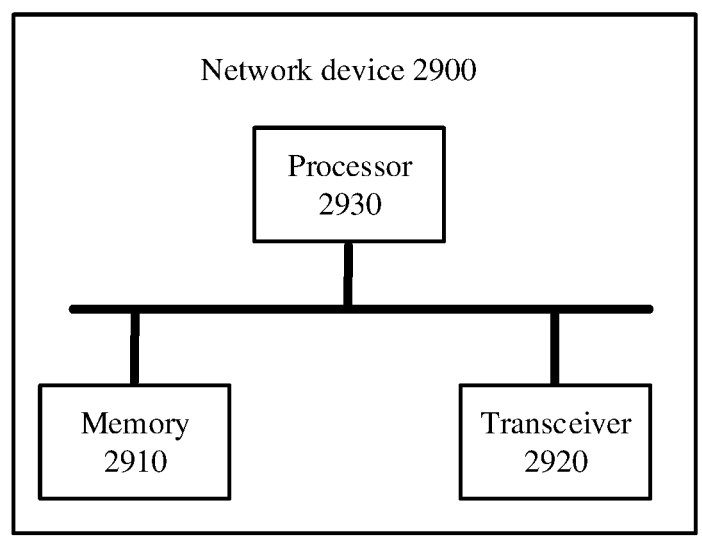
FIG. 29 is a schematic diagram of a network device according to another embodiment.

FIG. 29 is a schematic block diagram of a network device 2900 according to an embodiment. It should be understood that the network device 2900 can perform the steps performed by the second network device in the methods in FIG.

11 to FIG. 14. To avoid repetition, details are not described herein again. The network device 2900 includes:

a memory 2910, configured to store a program;

a transceiver 2920, configured to communicate with another device; and a processor 2930, configured to execute the program in the memory 2910, where when the program is executed, the processor 2930 is configured to receive report information from a first network device via the transceiver 2920, where the report information is used to indicate a result of modifying a configuration parameter of the first network slice subnet instance, the first network device is configured to manage the first network slice subnet instance, the second network device is configured to manage a first network slice instance, and the first network slice instance includes the first network slice subnet instance.

Persons of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. Persons skilled in the art may use a different method to implement the described functions for each particular application, but it should not be considered that the implementation goes beyond the scope of this application.

It may be clearly understood by persons skilled in the art that, for the purpose of convenient and brief description, for details about a detailed working process of the system, apparatus, and unit, refer to a corresponding process in the method embodiments. Details are not described herein again.

In the several exemplary embodiments provided in this application, it should be understood that the disclosed system, apparatus, and method may be implemented in other manners. For example, the described apparatus embodiment is merely an example. For example, the unit division is merely logical function division and may be other division in actual implementation. For example, a number of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate. Parts displayed as units may or may not be physical units, and may be located in one position or may be distributed on a number of network units. Some or all of the units may be selected depending on an actual need to achieve the objectives of the solutions of the embodiments.

In addition, function units in the exemplary embodiments may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions in this application essentially, or the part contributing to the prior art, or some of the technical solutions may be embodied in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely implementations of this application, but are not intended to limit the protection scope of this application. Any variation or replacement readily figured out by persons skilled in the art within the technical scope disclosed in this application shall fall within the protection scope of this application.

What is claimed is:

1. A network slice instance management method, comprising:

determining, by a first network device, that a configuration parameter of a first network slice subnet instance needs to be modified, wherein the first network device is configured to manage the first network slice subnet instance;

modifying, by the first network device, the configuration parameter of the first network slice subnet instance; and sending, by the first network device, report information to a second network device, wherein the report information is used to indicate a result of modifying the configuration parameter of the first network slice subnet instance, the second network device is configured to manage a first network slice instance, and the first network slice instance comprises the first network slice subnet instance.

2. The method according to claim 1, further comprising:

receiving, by the first network device, a self-optimization policy from the second network device, wherein the self-optimization policy is used to indicate a rule of modifying a network slice subnet instance; and the modifying, by the first network device, of the configuration parameter of the first network slice subnet instance comprises:

modifying, by the first network device, the configuration parameter of the first network slice subnet instance based on the self-optimization policy.

3. The method according to claim 1, further comprising:

receiving, by the first network device, authorization information from the second network device, wherein the authorization information is used to indicate permission for modifying the configuration parameter of the first network slice subnet instance.

4. The method according to claim 1, wherein the configuration parameter of the first network slice subnet instance comprises a capacity size of the first network slice subnet instance and a capability parameter of the first network slice subnet instance.

5. A network slice instance management method, comprising:

receiving, by a second network device, report information from a first network device, and the report information is used to indicate a result of modifying a configuration parameter of a first network slice subnet instance, the first network device is configured to manage the first network slice subnet instance, the second network device is configured to manage a first network slice instance, and the first network slice instance comprises the first network slice subnet instance.

6. The method according to claim 5, further comprising: sending, by the second network device, a self-optimization policy to the first network device, wherein the self-optimization policy is used to indicate a rule of modifying a network slice subnet instance.

7. The method according to claim 5, method further comprising: sending, by the second network device, authorization information to the first network device, wherein the authorization information is used to indicate permission for modifying the configuration parameter of the first network slice subnet instance.

8. The method according to claim 5, wherein the configuration parameter of the first network slice subnet instance comprises a capacity size of the first network slice subnet instance and a capability parameter of the first network slice subnet instance.

9. A network device, the network device comprising a first network device, and further comprising a processing unit and a communications unit, wherein
the processing unit is configured to determine that a configuration parameter of a first network slice subnet instance needs to be modified, wherein the first network device is configured to manage the first network slice subnet instance; modify the configuration parameter of the first network slice subnet instance; and send report information to a second network device via the communications unit, wherein the report information is used to indicate a result of modifying the configuration parameter of the first network slice subnet instance, the second network device is configured to manage a first network slice instance, and the first network slice instance comprises the first network slice subnet instance.

10. The network device according to claim 9, wherein the processing unit is further configured to receive a self-optimization policy from the second network device via the communications unit, wherein the self-optimization policy is used to indicate a rule of modifying a network slice subnet instance; and, in modifying the configuration parameter of the first network slice subnet instance, the processing unit is configured to modify the configuration parameter of the first network slice subnet instance based on the self-optimization policy.

11. The network device according to claim 9, wherein the processing unit is further configured to receive authorization information from the second network device via the communications unit, wherein the authorization information is used to indicate permission for modifying the configuration parameter of the first network slice subnet instance.

12. The network device according to claim 9, wherein the configuration parameter of the first network slice subnet instance comprises a capacity size of the first network slice subnet instance and a capability parameter of the first network slice subnet instance.

13. A network device, the network device comprising a second network device, and further comprising a processing unit and a communications unit, wherein
the processing unit is configured to receive report information from a first network device via the communications unit, wherein the report information is used to indicate a result of modifying a configuration parameter of a first network slice subnet instance, the first network device is configured to manage the first network slice subnet instance, the second network device is configured to manage a first network slice instance, and the first network slice instance comprises the first network slice subnet instance.

14. The network device according to claim 13, the processing unit is further configured to send a self-optimization policy to the first network device via the communications unit, wherein the self-optimization policy is used to indicate a rule of modifying a network slice subnet instance.

15. The network device according to claim 13, wherein the processing unit is further configured to send authorization information to the first network device via the communications unit, wherein the authorization information is used to indicate permission for modifying the configuration parameter of the first network slice subnet instance.

16. The network device according to claim 13, wherein the configuration parameter of the first network slice subnet instance comprises a capacity size of the first network slice subnet instance and a capability parameter of the first network slice subnet instance.

\* \* \* \* \*